(12) United States Patent
Liu et al.

(10) Patent No.: US 8,352,649 B2
(45) Date of Patent: Jan. 8, 2013

(54) STORAGE VIRTUALIZATION SUBSYSTEM ARCHITECTURE

(75) Inventors: Ling-Yi Liu, Taipei (TW); Cheng-Yu Lee, Chung-Ho (TW); Ching-Hua Fang, Taipei (TW)

(73) Assignee: Infortrend Technology, Inc., Chungho, Taipei Hsien (TW)

( * ) Notice: Subject to any disclaimer, the term of this patent is extended or adjusted under 35 U.S.C. 154(b) by 805 days.

(21) Appl. No.: 11/448,013

(22) Filed: Jun. 7, 2006

(65) Prior Publication Data

US 2006/0282639 A1 Dec. 14, 2006

Related U.S. Application Data

(60) Provisional application No. 60/595,153, filed on Jun. 9, 2005, provisional application No. 60/745,752, filed on Apr. 27, 2006.

(51) Int. Cl.
*G06F 3/00* (2006.01)

(52) U.S. Cl. ............. 710/62; 710/38; 710/316; 711/114

(58) Field of Classification Search .................. 711/157, 711/114, 162; 710/316, 38
See application file for complete search history.

(56) References Cited

U.S. PATENT DOCUMENTS

| | | | | |
|---|---|---|---|---|
| 5,692,155 A * | 11/1997 | Iskiyan et al. | ................. | 711/162 |
| 6,802,021 B1 * | 10/2004 | Cheng et al. | ................. | 714/4.11 |
| 7,089,448 B2 * | 8/2006 | Hinshaw et al. | ................. | 714/6 |
| 7,200,108 B2 * | 4/2007 | Beer et al. | ...................... | 370/222 |
| 2002/0083281 A1 * | 6/2002 | Carteau | ......................... | 711/161 |
| 2002/0103943 A1 * | 8/2002 | Lo et al. | ............................ | 710/2 |
| 2003/0193776 A1 * | 10/2003 | Bicknell et al. | ............... | 361/685 |
| 2004/0172489 A1 * | 9/2004 | Shikada | ......................... | 710/15 |
| 2004/0177218 A1 * | 9/2004 | Meehan et al. | ............... | 711/114 |
| 2005/0005062 A1 * | 1/2005 | Liu et al. | ....................... | 711/112 |
| 2005/0005063 A1 * | 1/2005 | Liu et al. | ....................... | 711/112 |
| 2005/0149674 A1 * | 7/2005 | Suzuki et al. | ................. | 711/114 |
| 2007/0214318 A1 * | 9/2007 | Abe et al. | ....................... | 711/114 |
| 2008/0276032 A1 * | 11/2008 | Iida et al. | ....................... | 710/316 |

* cited by examiner

*Primary Examiner* — Ernest Unelus

(74) *Attorney, Agent, or Firm* — Muncy, Geissler, Olds & Lowe, PLLC

(57) ABSTRACT

Disclosed is a storage virtualization subsystem (SVS) architecture comprising a plurality of SVSs, each SVS comprising at least one storage virtualization controller (SVC), and, in some cases, a physical storage disk (PSD) array attached to the SVC. A first and a second data access path is configured passing through the SVSs to form the SVS architecture such that when one path is failed, the other can be taken as a substitution. The SVSs in the first path are connected in a first sequence and the SVSs in the second path are connected in a second sequence different from the first one. In another embodiment, each SVS comprises a plurality of redundantly-configured SVCs rather than one SVC. The first path is formed passing through a first set of SVCs and the second path is formed passing through a different second set of SVCs.

54 Claims, 15 Drawing Sheets

STORAGE VIRTUALIZATION SUBSYSTEM ARCHITECTURE

RELATED APPLICATIONS

This application claims priority to provisional patent applications Ser. No. 60/595,153, filed Jun. 9, 2005, an entitled "Storage Virtualization Subsystem Architecture", and Ser. No. 60/745,752, filed Apr. 27, 2006, and entitled "SAS RAID head", both of which are incorporated herein by reference.

BACKGROUND OF THE INVENTION

1. Field of the Invention

The present invention pertains to a storage virtualization subsystem architecture, particularly pertaining to configuration of a storage virtualization subsystem architecture containing a plurality of storage virtualization subsystems connected together.

2. Description of the Prior Art

In a storage virtualization subsystem (SVS) architecture containing a plurality of SVSs connected together, when there is only one data access path is configured through the SVS architecture, data access to the SVSs will be lost while there exists a single point failure.

Therefore, there is a need for a SVS architecture configuration which can prevent the SVS architecture from lost of data accessibility due to a single point failure in the SVS architecture.

SUMMARY OF THE INVENTION

A main object of the invention is to provide a storage virtualization subsystem (SVS) architecture comprising at least two SVSs, each SVS comprising at least one storage virtualization controller (SVC); a first and a second data access path is configured passing through the SVS architecture for accessing the PSD arrays; wherein the two paths are configured in a way that the SVSs in the first path are connected in a first sequence and the SVSs in the second path are connected in a second sequence different from the first sequence.

A further object of the invention is to provide a computer system comprising the above-mentioned SVS architecture for implementing storage virtualization.

A still further object of the invention is to provide a method for providing the above-mentioned SVS architecture.

DETAILED DESCRIPTION OF THE INVENTION

Brief Introduction to Storage Virtualization

Figure 1A:
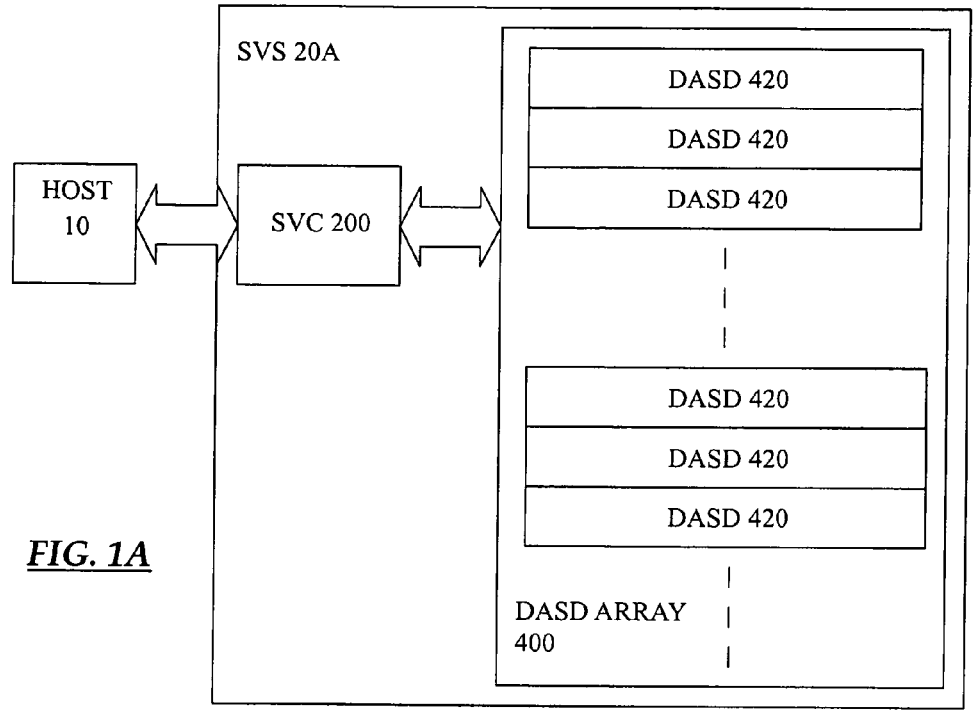
FIG. 1A is a block diagram showing a main structure of an embodiment of a system comprising a SVS according to the present invention.

Storage virtualization is a technology that has been used to virtualize physical storage by combining sections of physical storage devices (PSDs) into logical storage entities, herein referred to as logical media units (LMUs), that are made accessible to a host system. This technology has been used primarily in redundant arrays of independent disks (RAID) storage virtualization, which combines smaller physical storage devices into larger, fault tolerant, higher performance logical media units via RAID technology.

A storage virtualization controller, abbreviated SVC, is a device the primary purpose of which is to map combinations of sections of physical storage media to logical media units visible to a host system. IO requests received from the host system are parsed and interpreted and associated operations and data are translated into physical storage device IO requests. This process may be indirect with operations cached, delayed (e.g., write-back), anticipated (read-ahead), grouped, etc., to improve performance and other operational characteristics so that a host IO request may not necessarily result directly in physical storage device IO requests in a one-to-one fashion.

An external (sometime referred to as "stand-alone") storage virtualization controller is a storage virtualization controller that connects to the host system via an IO interface and that is capable of supporting connection to devices that reside external to the host system and, in general, operates independently of the host.

One example of an external storage virtualization controller is an external, or stand-alone, direct-access RAID controller. A RAID controller combines sections on one or multiple physical direct access storage devices (DASDs), the combination of which is determined by the nature of a particular RAID level, to form logical media units that are contiguously addressable by a host system to which the logical media unit is made available. A single RAID controller will typically support multiple RAID levels so that different logical media units may consist of sections of DASDs combined in different ways by virtue of the different RAID levels that characterize the different units.

Another example of an external storage virtualization controller is a JBOD emulation controller. A JBOD, short for "Just a Bunch of Drives", is a set of physical DASDs that connect directly to a host system via one or more multiple-device IO device interconnect channels. DASDs that implement point-to-point IO device interconnects to connect to the host system (e.g., Parallel ATA HDDs, Serial ATA HDDs, etc.) cannot be directly combined to form a "JBOD" system as defined above for they do not allow the connection of multiple devices directly to the IO device channel. An intelligent "JBOD emulation" device can be used to emulate multiple multiple-device IO device interconnect DASDs by mapping IO requests to physical DASDs that connect to the JBOD emulation device individually via the point-to-point IO-device interconnection channels.

Another example of an external storage virtualization controller is a controller for an external tape backup subsystem.

The primary function of a storage virtualization controller, abbreviated as SVC, is to manage, combine, and manipulate physical storage devices in such a way as to present them as a set of logical media units to the host. Each LMU is presented to the host as if it were a directly-connected physical storage device (PSD) of which the LMU is supposed to be the logical equivalent. In order to accomplish this, IO requests sent out by the host to be processed by the SVC that will normally generate certain behavior in an equivalent PSD also generate logically equivalent behavior on the part of the SVC in relation to the addressed logical media unit. The result is that the host "thinks" it is directly connected to and communicating with a PSD when in actuality the host is connected to a SVC that is simply emulating the behavior of the PSD of which the addressed logical media unit is the logical equivalent.

In order to achieve this behavioral emulation, the SVC maps IO requests received from the host to logically equivalent internal operations. Some of these operations can be completed without the need to directly generate any device-side IO requests to device-side PSDs. Among these are operations that are processed internally only, without ever the need to access the device-side PSDs. The operations that are initiated as a result of such IO requests will herein be termed "internally-emulated operations".

There are operations that cannot be performed simply through internal emulation and yet may not directly result in device-side PSD accesses. Examples of such include cached operations, such as data read operations in which valid data corresponding to the media section addressed by the IO request currently happens to reside entirely in the SVC's data cache, or data write operations when the SVC's cache is operating in write-back mode so that data is written into the cache only at first, to be committed to the appropriate PSDs at a future time. Such operations will be referred to as "asynchronous device operations" (meaning that any actual IO requests to device-side PSDs that must transpire in order for the requested operation to achieve its intended goal are indirectly performed either prior or subsequent to the operation rather than directly in response to the operation).

Yet another class of operations consists of those that directly generate device-side IO requests to PSDs in order to be completed. Such operations will be referred to as "synchronous device operations".

Some host-side IO requests may map an operation that may consist of multiple sub-operations of different classes, including internally-emulated, asynchronous device and/or synchronous device operations. An example of a host-side IO request that maps to a combination of asynchronous and synchronous device operations is a data read request that addresses a section of media in the logical media unit part of whose corresponding data currently resides in cache and part of whose data does not reside in cache and therefore must be read from the PSDs. The sub-operation that takes data from the cache is an asynchronous one because the sub-operation does not directly require device-side PSD accesses to be completed, and however, does indirectly rely on results of previously-executed device-side PSD accesses. The sub-operation that reads data from the PSDs is a synchronous one, for it requires direct and immediate device-side PSD accesses in order to be completed.

Storage virtualization subsystem may provide storage virtualization to hosts connected via standard host-storage interfaces using a plurality of SVCs configured redundantly so that one of the SVCs will take over all the operations originally performed by another SVC should it malfunction.

EMBODIMENTS OF THE INVENTION

FIG. 1A is a block diagram showing a main structure of an embodiment of a system comprising a SVS (Storage Virtualization Subsystem) 20 according to the present invention. The system according to the present invention comprises a host computer 10 and a SVS 20 connecting thereto. Although there is illustrated in FIG. 1A only one host IO connected with one SVS 20, there can be more than one SVS 20 attached to the host 10; or, more than one host 10 can be attached to the SVS 20. Or more than one host 10 can be attached to more than one SVS 20.

The host 10 can be a server system, a workstation, or a PC system, or the like. Alternatively, the host 10 can be another SVS or SVC. The SVS 20 comprises a SVC (Storage Virtualization Controller) 200, which can be a RAID controller or a JBOD emulator controller, and a DASD (direct access storage device) array 400. Although only one DASD array 400 is illustrated here, more then one DASD array 400 can be attached to the SVC 200. In another embodiment, not shown in both FIGS. 1A and 1B, the SVS 20 may comprise no DASK array 400 inside for payload data, but externally attached the DASK array 400 or a JBOD thereto for payload data instead. In this case, the SVS 20 is termed as a "RAID head" for just providing RAID functions and to be the connection interface between the host 10 and the outside-attached DASK array 400 or JBOD, rather than providing data storage space.

In one embodiment, the SVC 200 can be a SAS (Serial-Attached Small Computer System Interface, Serial-Attached SCSI) SVC, i.e., a SVC implemented complying with the SAS protocol. The SVC 200 receives the 10 requests and related data (including control signals and data signals) from the host 10 and executes the IO requests internally or maps them to the DASD array 400. The SVC 200 can be used to enhance performance and/or to improve data availability and/or to increase storage capacity of a single logical media unit (e.g. a logical disk) in view of the host 10. The DASD array 400 comprises a plurality of DASDs 420, such as hard disk drive (HDD), which comprises either SAS DASDs or SATA DASDs or both.

When a logical media unit in the SVS 20 is set to use a RAID level other than level 0 or 1, for example, levels 3 to 6, the DASD array 400 contains at least one parity DASD, that is, a DASD which contains parity data therein, and data availability can thus be improved. In addition, the performance can be improved in execution of an IO operation, since the accessed data is distributed over more than one DASD. Moreover, since the logical media unit is a combination of sections of a plurality of DASDs, the accessible storage capacity in a single logical media unit can be largely increased. For example, in a RAID subsystem of RAID level 5, the functionality described above can all be achieved. In a RAID subsystem of RAID level 6, it is similar to RAID 5, but it contains parity data that can protect against data loss due to two or more failed DASDs and increases the data availability of the storage system.

When a logical media unit in the SVS 20 is set to use a RAID level 1, the same data will be stored in two separate DASDs, and thus data availability can be greatly enhanced at the cost of doubling the DASD cost.

When a logical media unit in the SVS 20 is set to use a RAID level 0, performance improvement rather than the availability concern is the main issue and thus no enhancement of data availability is provided. Performance, however, can be greatly improved. For example, a RAID subsystem of RAID level 0 having 2 hard disk drives can have, theoretically, a performance of 200% comparing with a storage device having only one hard disk drive, since different data sections can be stored into the two separate hard disk drives at the same time under the control of the SVC 200.

Figure 1B:
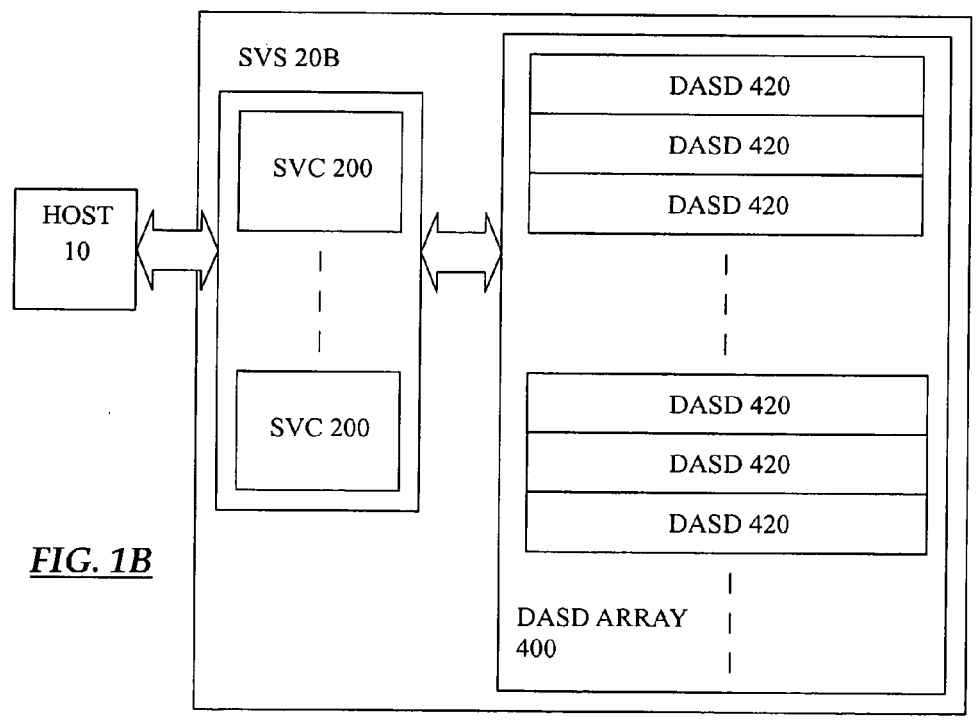
FIG. 1B is a block diagram showing a main structure of an embodiment of a system comprising a SVS having a plurality SVCs redundantly configured according to the present invention.

FIG. 1B is a block diagram showing a main structure of an embodiment of a system comprising a SVS 20 having a plurality SVCs 200 redundantly configured according to the present invention. In such configuration, when one SVC 200 fails/malfunctions, another SVC 200 will take over all the operations originally performed by the failed/malfunctioned SVC.

Figure 2A:
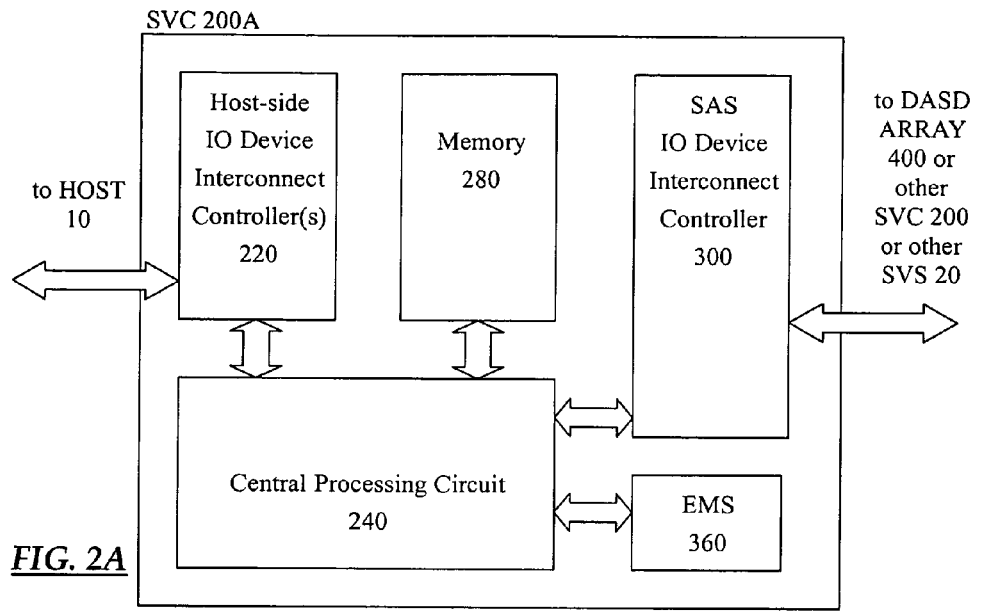
FIG. 2A is a block diagram showing a first embodiment of an SVC 200 according to the present invention.

FIG. 2A is a block diagram showing a first embodiment of an SVC 200 according to the present invention and the connection thereof to the host 10 and the DASD array 400. In this embodiment, the SVC 200A comprises a host-side IO device interconnect controller 220, a CPC (central processing circuitry) 240, a memory 280, an enclosure management service circuitry (EMS) 360, and a SAS IO device interconnect controller 300, which acts as a device-side IO device interconnect controller 300. Although illustrated in separate functional blocks, two or more or even all of these functional blocks can be incorporated into one chip in practical implementation. In another embodiment of the present invention, the device-side IO device interconnect controller 300 can be one complying with other protocols, such as FC (Fibre Channel), SCSI (Small Computer System Interface), SATA (Serial Advanced Technology Attachment), etc.

The host-side IO device interconnect controller 220 is connected to the host 10 and the CPC 240. The host-side IO device interconnect controller 220 is an interface and buffer between the SVC 200A and the host 10, and receives IO requests and related data from the host 10 and maps and/or transfers them to the CPC 240. The host-side IO device interconnect controller 220 can be of any of the following protocols: Fibre/SCSI/iSCSI/LAN/SAS.

The CPC 240 mainly comprises a CPU (central processing unit) and a CPU chipset (not shown). The CPU chipset is provided to interface the CPU with other circuitry of the SVC 200. When the CPC 240 receives the IO requests of the host 10 from the host-side IO device interconnect controller 220, CPC 240 parses it and performs some operations in response to the IO requests and sends the data requested and/or reports and/or information of the SVC 200A back to the host 10 through the host-side IO device interconnect controller 220.

After parsing a request received from the host 10, while a read request is received and one or more operations are performed in response, the CPC 240 gets the requested data either internally or from the memory 280 or in both ways and transfers them to the host 10. If the data is not available internally or does not exists in the memory 280, the IO request will be issued to the DASD array 400 through the SAS IO device interconnect controller 300 and the requested data will be transferred from the DASD array 400 to memory 280 and then passed on to the host 10 through the host-side IO device interconnect controller 220.

When a write request is received from the host 10, after parsing the request and performing one or more operations, the CPC 240 gets the data from the host 10 through the host-side IO device interconnect controller 220, stores them to the memory 280 and then move them out to the DASD array 400 through the CPC 240. The write request can be processed as either a write-back request or a write-through request. When the write request is processed as a write-back request by the SVC 200, the IO complete report can be issued to the host first and then the CPC 240 performs the actual write operation later. Otherwise, when the write request is processed as a write-through request by the SVC 200, an IO complete report is issued to the host 10 after the requested data is actually written into the DASD array 400.

The memory 280 is connected to the CPC 240 and acts as a buffer therefor to buffer the data transferred between the host 10 and the DASD array 400 passing through the CPC 240. In one embodiment, the memory 280 can be a DRAM; more particularly, the DRAM can be a SDRAM.

The SAS IO device interconnect controller 300 is connected to the CPC 240 and the DASD array 400/other SVCs 200/other SVSs 20. The SAS IO device interconnect controller 300 is an interface and buffer between the SVC 200A and the DASD array 400, and receives IO requests and related data issued from the CPC 240 and maps and/or transfers them to the DASD array 400. The device-side IO device interconnect controller 300 re-formats the data and control signals received from CPC 240 to comply with the protocol used in the device-side IO device interconnect and transmits them to the DASD array 400/other SVCs 200/other SVSs 20. When a SAS IO device interconnect controller 300 is used as the device-side IO device interconnect controller, it re-formats the data and control signals received from CPC 240 to comply with the SAS protocol.

When the DASD 420 in the DASD array 400 receives the IO requests of the CPC 240 through the SAS IO device interconnect controller 300, it performs some operations in response to the IO requests and transfers the requested data and/or reports and/or information to and/or from the CPC 240. More than one type of DASDs 420 can be provided in the DASD array 400. For example, the DASD array 400 comprises both SAS DASDs and SATA DASDs when the SAS IO device interconnect controller is used.

The enclosure management service circuitry (EMS) 360 is attached to the CPC 240 for managing circuitry on an enclosure for containing the DASD array 400. In addition, the EMS circuit 360 is provided outside the SVC 200 rather than in the SVC 200. In another arrangement of the SVS 20, the enclosure management service circuitry (EMS) 360 can be omitted, depending on the actual requirements of various product functionalities.

Figure 2B:
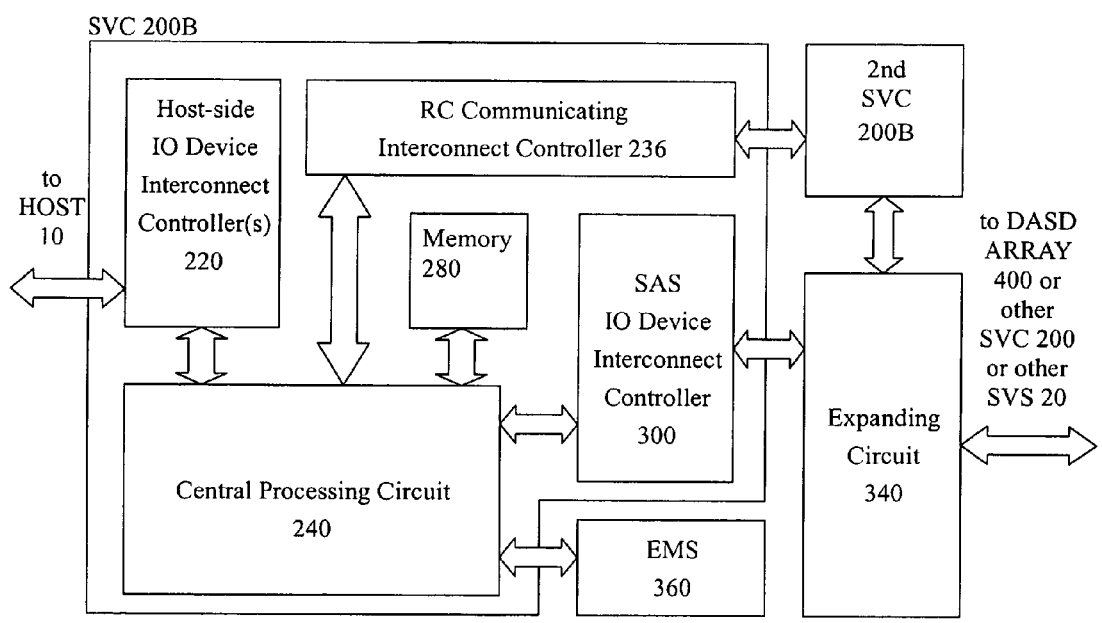
FIG. 2B is a block diagram showing a second embodiment of an SVC 200 according to the present invention.

FIG. 2B is a block diagram showing a second embodiment of an SVC 200 according to the present invention and the connecting arrangement thereof to the host 10 and the DASD array 400 through an expanding circuit 340 provided outside the SVC 200. In this embodiment, the SVC 200B comprises a host-side IO device interconnect controller 220, a CPC 240, a memory 280, a SAS IO device interconnect controller 300, and a redundant controller communicating (RCC) interconnect controller 236. Although illustrated in separate functional blocks, some or all of these functional blocks can be incorporated into one chip.

Comparing with SVC 200A, in this embodiment, the RCC interconnect controller 236 is implemented in SVC 200B to connect the CPC 240 to a second SVC 200B. In addition, the SAS IO device interconnect controller 300 is connected to the DASD array 400/other SVCs 200/other SVSs 20 through the expanding circuit 340. The expanding circuit 340 is also connected to the second SVC 200B. In this arrangement, one or more redundant second SVCs 200B can be attached to the SVC 200B. The DASD array 400 can be accessed by the SVCs 200B, through the expanding circuit 340. Moreover, the control/data information from the host 10 can be transferred from the CPC 240 through the RCC interconnect controller 236 to the second SVC 200B, and further to a second DASD array (not shown) if required. Since there are more than one SVC 200B, while the DASDs 420 are SATA DASD used in the DASD array 400, an SATA multiplexing circuit can be provided between the SVCs 200B and a SATA DASD as a port selector when more than one SVC 200B are connected to the SATA DASD. This will occur when, for example, the SVCs 200B are configured into a redundant SVC set in a SVS including the SATA DASDs.

The RCC interconnect controller 236 can be integrated with the host-side IO device interconnect controller 220 as a single-chip IC, which comprises a plurality of IO ports including one or more host-side ports and one or more device-side ports. Alternatively, the RCC interconnect controller 236 can be integrated with the device-side IO device interconnect controller 300 as a single-chip IC. Furthermore, the host-side IO device interconnect controller 220, the device-side IO device interconnect controller 300, and the RCC interconnect controller 236 can all be integrated as a single-chip IC. In such an implementation, the single-chip IO device interconnect controller may comprise IO ports for using as host-side port (s), device-side port(s), and IO ports for connecting between/among the SVCs 200B.

In the embodiments of FIGS. 2A-2B, the host-side IO device interconnect controller 220 and the device-side IO device interconnect controller 300 (or SAS IO device interconnect controller 300) could be implemented with the same kind of IC chip, with IO device interconnect ports in the host-side IO device interconnect controller 220 configured as host-side IO device interconnect ports and with IO device interconnect ports in the device-side IO device interconnect controller 300 configured as device-side IO device interconnect ports. Alternately, a single chip could be configured to contain both host-side IO device interconnect ports and device-side IO device interconnect ports for, respectively, coupling to the host entity 10 and the PSD array 400 concurrently. Furthermore, a single chip could be configured to contain all the host-side IO device interconnect ports for coupling to the host entity 10, the device-side IO device interconnect ports for coupling to the PSD array 400, and ports for coupling to a second SVC 200B, respectively but concurrently.

Alternatively, the EMS circuit 360 can be incorporated into CPC 240. Moreover, the EMS 360 can be implemented in the SAS IO device interconnect controller 300 as well.

Figure 6A:
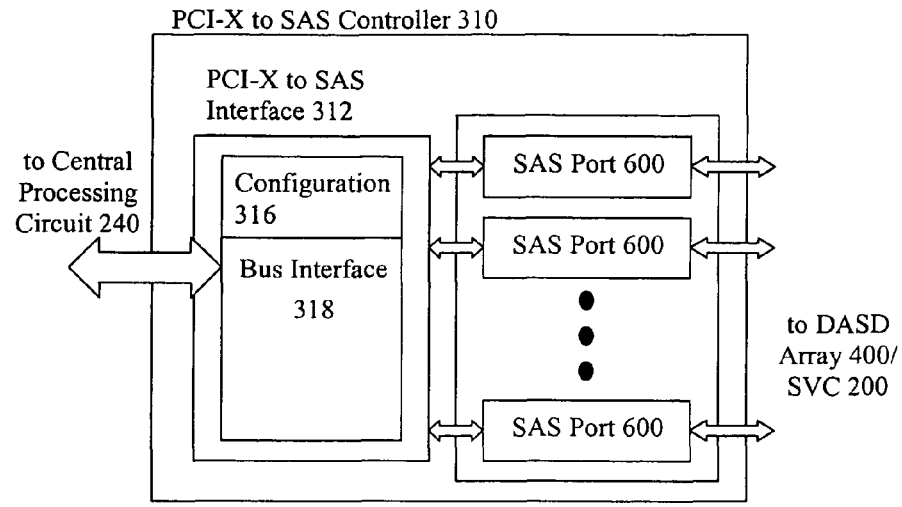
FIG. 6A is a block diagram illustrating an embodiment of the PCI-X to SAS controller 310.

According to an embodiment of the present invention, when a SAS IO device interconnect controller is used as the device-side IO device interconnect controller 300 in FIG. 2A, the SAS IO device interconnect controller 300 may comprise two PCI-X to SAS controllers 310, as shown in FIG. 6A.

FIG. 6A is a block diagram illustrating an embodiment of the PCI-X to SAS controller 310. As shown in FIG. 6A, each PCI-X to SAS controller 310 contains a PCI-X interface 312 connected to the CPC 240 and the SAS ports 600 connected to the PCI-X interface 312. The PCI-X interface 312 comprises a bus interface 318 connecting to SAS ports 600 and a configuration circuitry 316 storing the configuration of the PCI-X to SAS controller 310. The SAS port 600 can be connected to the DASD array 400 and/or the SVC 200.

Figure 8A:
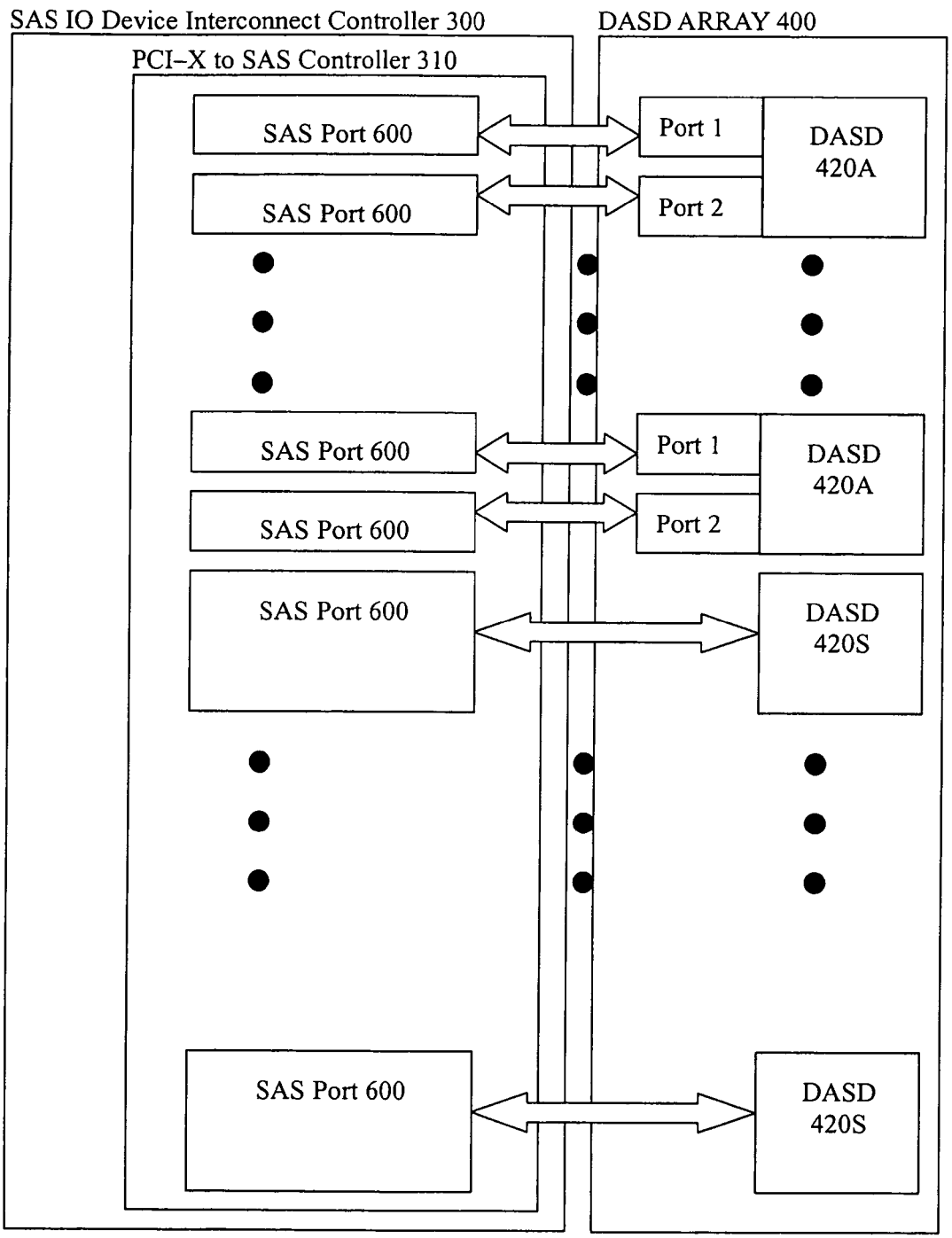
FIG. 8A is a block diagram illustrating in more detail the connection between SAS IO Device Interconnect Controller 300 and DASD array 400 in FIG. 2A; and, FIG. 8B is a block diagram illustrating in more detail the connecting arrangement between the expanding circuit and other functional blocks in FIG. 2B.

FIG. 8A is a block diagram illustrating in more detail the connection between a SAS IO Device Interconnect Controller 300 and DASD array 400 in FIG. 2A. Through a SAS port 600 of the PCI-X to SAS controller 310, the data and control signals are transmitted to the DASD 420. The SAS port 600 can be directly connected to either a SAS port of a SAS DASD 420A or a SATA port of a SATA DASD 420S. In addition, since there are two separate ports, port 1 and port 2, on each SAS DASD 420A, two different SAS ports on the PCI-X to SAS controller 310 (or even on different PCI-X to SAS controllers 310, which is not shown in FIG. 8A) can be connected to a SAS DASD 420A through two different ports, which forms for a single SAS DASD 420A a redundant port pair having redundant interconnects to the SVC 200.

In an alternative embodiment, a PCI-Express (PCI-E for short) to SATA controller (not shown) can be used in place of the PCI-X to SATA controller 310. In the PCI-E to SATA controller, a PCI-E interface (not shown) is used in place of the PCI-X interface 312. In another alternative embodiment, a PCI to SATA controller can be used in place of the PCI-X to SATA controller 310. In the PCI to SATA controller, a PCI interface is used in place of the PCI-X interface 312. Those skilled in the art will know such replacement can be easily accomplished without any difficulty.

Figure 6B:
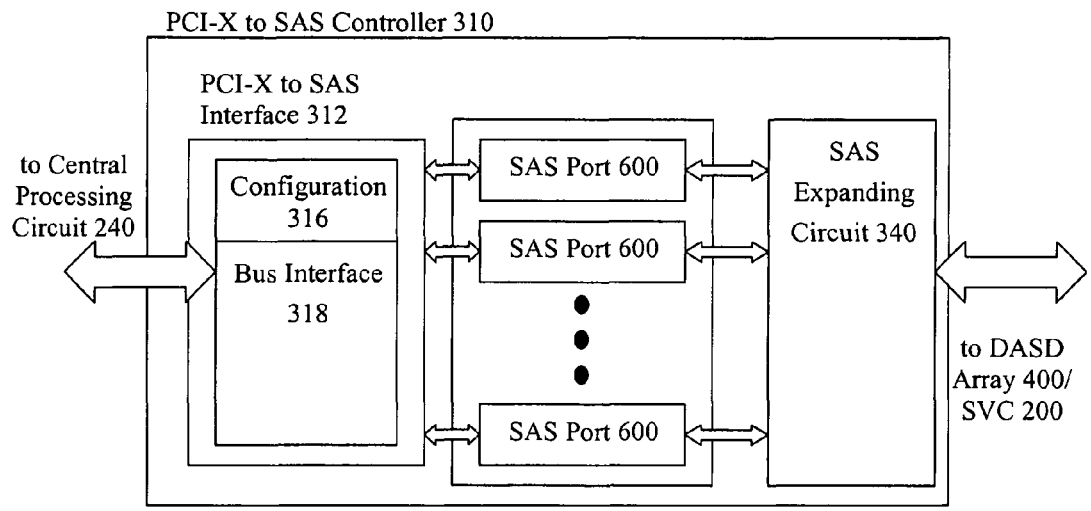
FIG. 6B is a block diagram illustrating a second embodiment of the PCI-X to SAS controller 310.
Figure 6C:
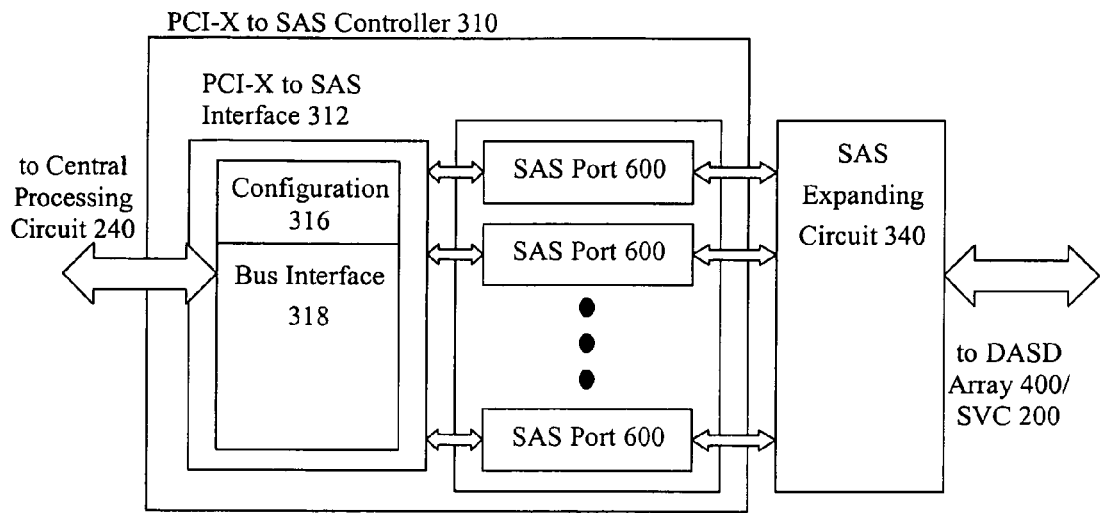
FIG. 6C is a block diagram illustrating a first implementation of connecting arrangement of the DASD array 400 to the PCI-X to SAS controller 310 of FIG. 6A.

FIG. 6B is a block diagram illustrating a second embodiment of the PCI-X to SAS controller 310, which comprises a SAS expanding circuit 340 incorporated therein. A SAS expanding circuit 340 can be implemented as an edge expander device 315, as shown in FIG. 6E, which can connect to another one or two edge expander device 315 and/or a plurality of end devices, such as SAS ports of one or more DASDs 420. Also, a SAS expanding circuit 340 can be implemented to contain one or more edge expander device sets each comprising a plurality of edge expander devices 315. In addition, a SAS expanding circuit 340 can be implemented as a fanout expander device containing a plurality of edge expander device sets each containing a plurality of edge expander devices 315.

The SAS expander device 315 comprises an expander connection block 3151, a management function block 3152, and a plurality of PHYs 3154. The expander connection block 3151 provides the multiplexing functionality to connect each PHY 3154 for signal input and output. The management function block 3152 performs the SMP (Serial Management Protocol) operation of an expander. Through the expander device 315, a plurality of DASDs can be connected to a SAS controller 310, which improves the scalability of the storage volume of the SVS, while through the fanout expander device, a lot of edge expander device sets can be attached thereto, which largely enhances the volume scalability of the SVS. Besides, a plurality of host-side IO device interconnects can be connected to the expanding device 340. These host-side IO device interconnects connect to either the same or different SVCs 200.

Figure 6D:
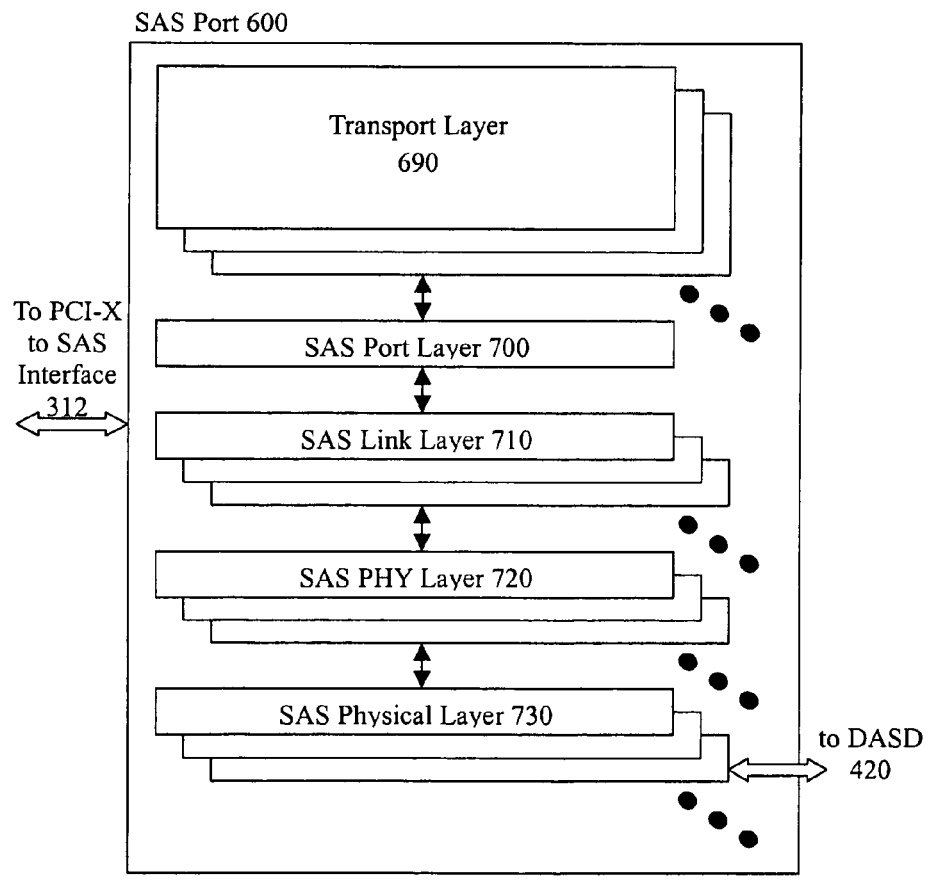
FIG. 6D is a block diagram illustrating an embodiment of the SAS port of FIG. 6A/6B/6C.
Figure 6E:
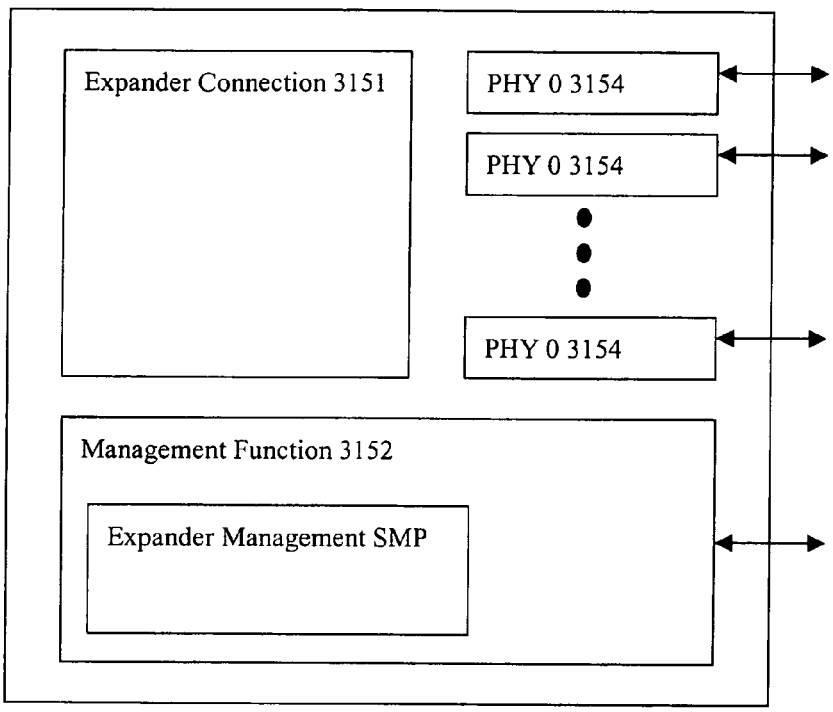
FIG. 6E is a block diagram illustrating an embodiment of the SAS expander device 315 used in the SAS expanding circuit 340 of FIG. 6B/6C.

FIG. 6D is a block diagram illustrating an embodiment of the SAS port 600. As shown in FIG. 6D, the SAS port 600 comprises five parts: the transport layer 690, SAS port layer 700, SAS linker layer 710, SAS PHY layer 720, and SAS physical layer 730. The SAS physical layer 730 includes the SAS connector and cables, and SAS transmitting and receiving circuit. The SAS PHY layer 720 will cover the encoding scheme and the PHY reset sequence including OOB (Out Of Band) signaling and speed negotiation. The SAS link layer 710 will control the SAS PHY layer to manage connections with other SAS devices. The SAS port layer 700 locates between one or more SAS link layer and one or more SAS transport layers, receives and interprets requests and establishes connections by correct SAS link layers 710. The SAS transport layer 690 comprises SSP (Serial SCSI Protocol) transport layer for serial SCSI application, STP (Serial ATA Tunneling Protocol) transport layer for SATA application and SMP (Serial Management Protocol) transport layer for management application.

A SAS port 600 contains one or more PHYs. It could be a "wide" port if there is more than one PHY in the port or be a "narrow" port if there is only one PHY. The link between SAS IO device interconnect controller 300 (i.e., the device-side IO device interconnect controller) and expanding circuit 340 or DASD array 400 could be a narrow link or a wide link. A wide link can be configured to link between wide ports at both ends to enlarge the transmission bandwidth.

Figure 6F:
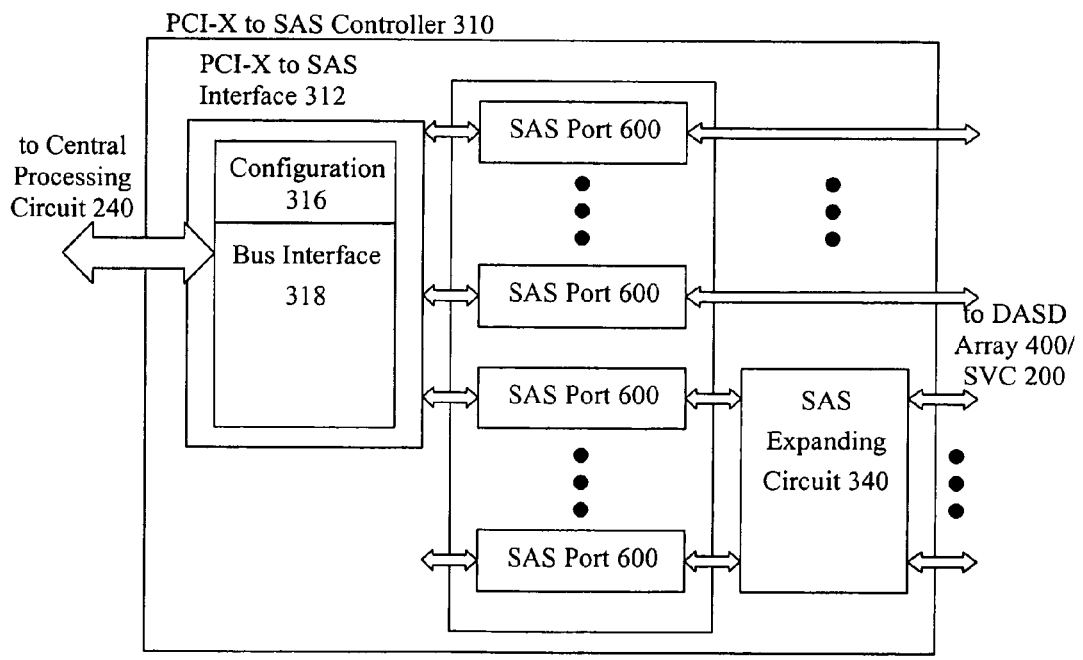
FIG. 6F is a block diagram illustrating a third embodiment of the PCI-X to SAS controller 310.

FIG. 6F is a block diagram illustrating a third embodiment of the PCI-X to SAS controller 310. In this embodiment, some of the SAS ports 600 are connected to the expanding circuit 340 and some of the SAS ports 600 are provided for direct connecting to the DASDs 420, and/or some of the SAS ports 600 are connected to the SVC 200. In addition, the expanding circuit 340 can be further connected to the DASDs 420 and/or the SVC 200.

The physical layer 730 will transmit signals through a pair of differential signal lines, transmission lines LTX+, LTX−, to and receive signals through the other pair of differential signal lines, reception lines LRX+, LRX−, from the DASD controller in the DASD 420. The two signal lines of each pair of the signal lines, for example LTX+/LTX−, transmit signals TX+/TX− simultaneously at inverse voltage, for example, +V/−V or −V/+V, with respective to a reference voltage Vref so that the voltage difference will be +2V or −2V and thus to enhance the signal quality thereof. This is also applicable to the transmission of the reception signals RX+/RX− on reception lines LRX+, LRX−.

The PHY layer 720 defines 8*b*/10*b* coding and OOB (Out Of Band) signals. All data bytes received from the physical layer 730 will be decoded the 8*b*/10*b* characters and removed the SOF (Start of Frame), CRC (Cyclic Redundancy Check), EOF (End of Frame). A SAS PHY layer 720 uses the OOB signals to identify and start the operational link connected to another SAS PHY layer 720. After SAS link is operational, the SAS PHY layer 720 signals the SAS link layer 710 and the SAS link layer 710 assumes control of the SAS PHY layer 720 for communication, including identification sequence, connection management and frame transmission. There are two important structures, SAS primitives and SAS frames used by SAS link layer 710.

A primitive consists of a single double-word and is the simplest unit of information that may be communicated between a host and a device. When the bytes in a primitive are encoded, the resulting pattern is not easy to be misinterpreted as another primitive or a random pattern. Primitives are used primarily to convey real-time state information, to control the transfer of information and to coordinate communication between the host and the device. The first byte of a primitive is a special character.

A frame consists of a plurality of double-words, and starts with a start primitive and ends with an end primitive. The SAS address frame is used when a connection is not established and starts with a SOAF (Start of Address Frame) and ends with an EOAF (End of Address Frame).

There are three types of connections supported by the SAS, including a SSP frame for SAS devices, a STP frame for SATA devices, and a SMP frame for management. The SSP frame and SMP frame starts with a SOF (Start of Frame) and ends with an EOF (End of Frame).

A CRC (Cyclic-Redundancy Check Code) is the last non-primitive double word immediately preceding the end primitive. CRC code will be calculated over the contents of the frame, all IO request information communicating between CPC 240 and the DASD 420 through the PCI-X to SAS Controller 310 will perform CRC checking. Hence, inadvertent data corruption (e.g., due to noise) during the transfer from SVC 200 to PSD may be detected and recovered, preventing a potential catastrophic data corruption situation in which data gets written to the wrong section of media possibly due to corruption of the destination media section base address and/or media section length that are contained in the initial IO request data.

FIG. 6C is a block diagram illustrating a first implementation of connecting arrangement of the DASD array 400 to the PCI-X to SAS controller 310 of FIG. 6A, in which the SAS expanding circuit 340 is not provided in the PCI-X to SAS controller 310 but rather provided as a separate device which can be attached to the PCI-X to SAS controller 310 as an interface/controller to the DASD ARRAY 400 or another SAS expanding circuit 340.

Figure 6G:
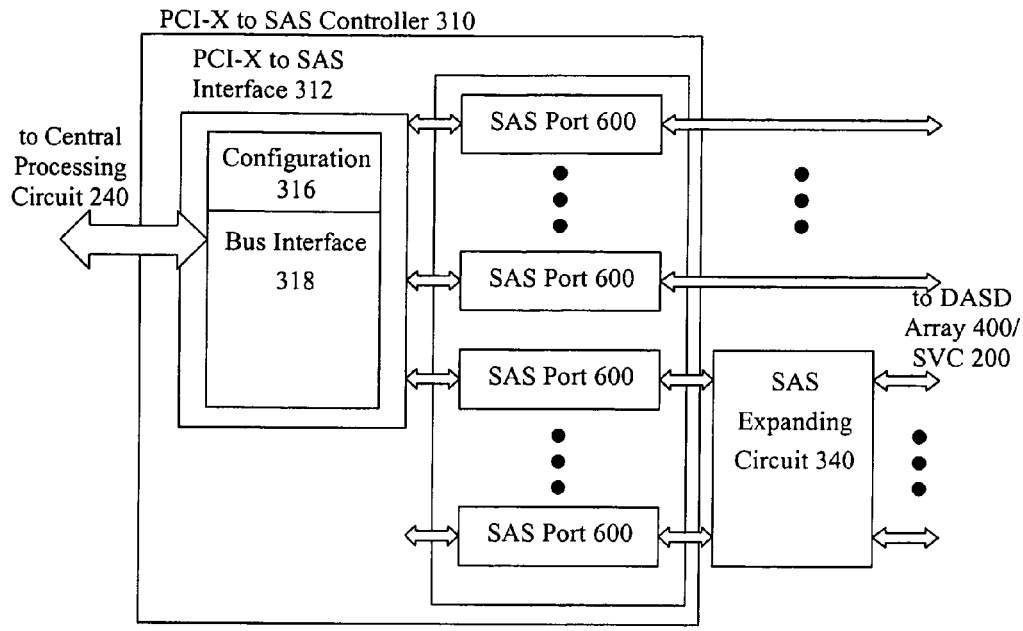
FIG. 6G is a block diagram illustrating a second implementation connecting arrangement of the DASD array 400 to the PCI-X to SAS controller 310 of FIG. 6A.

FIG. 6G is a block diagram illustrating a second implementation of connecting arrangement of the DASD array 400 to the PCI-X to SAS controller 310 of FIG. 6A, in which the SAS expanding circuit 340 is not provided in the PCI-X to SAS controller 310 but rather provided as a separate device. In this embodiment, some of the SAS ports 600 are connected to the expanding circuit 340 and some of the SAS ports 600 are provided for directly connecting to the DASDs 420, and/or some of the SAS ports 600 are connected to the SVC 200. In addition, the expanding circuit 340 can be further connected to the DASDs 420 and/or the SVC 200.

Figure 8B:
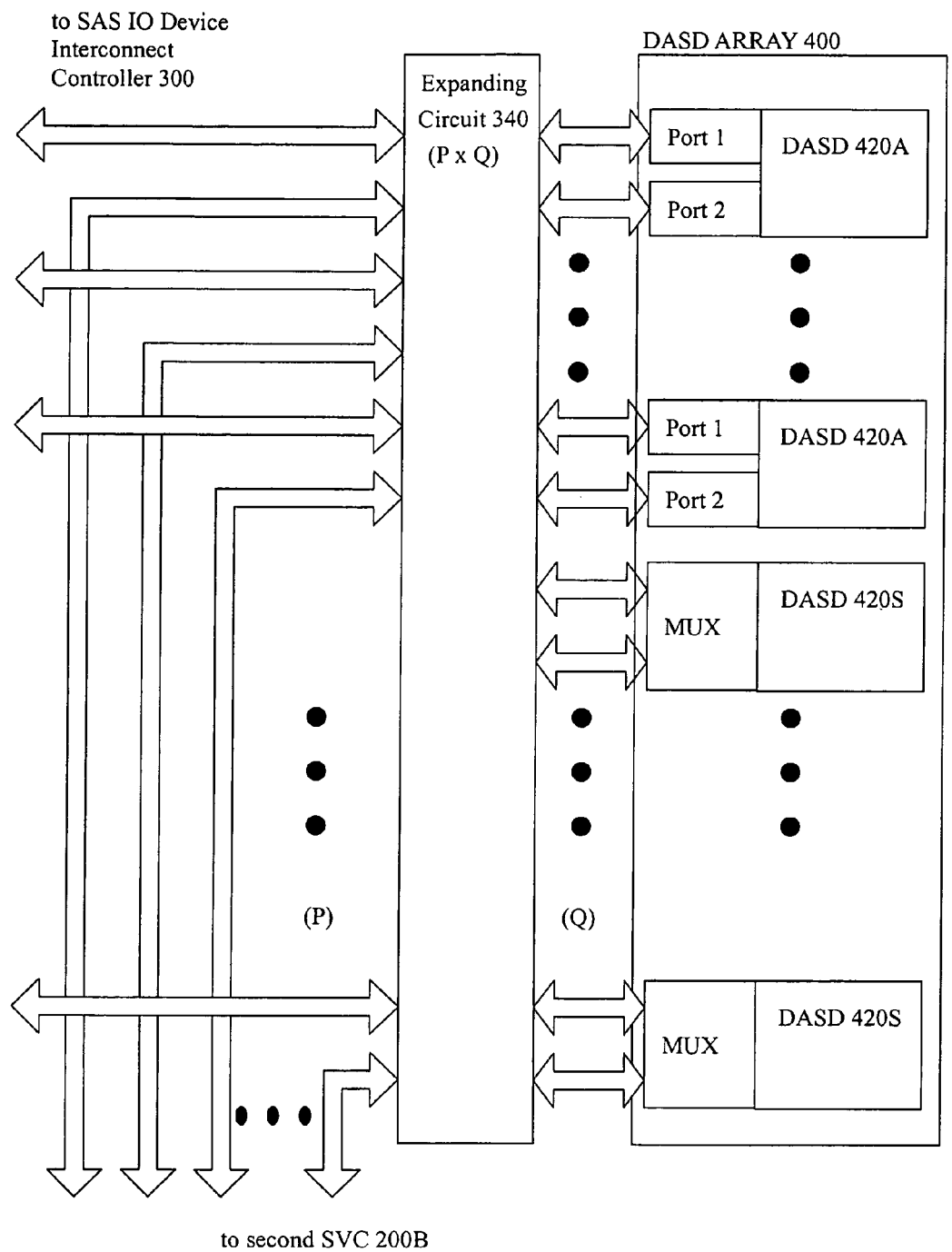

FIG. 8B is a block diagram illustrating in more detail the connection between the expanding circuit 340 and other functional blocks in FIG. 2B, or FIG. 6B/6C/6G. The expanding circuit 340 can receive the command/data from the SAS IO device interconnect controller 300 (i.e. the device-side IO device interconnect controller 300) and transfer them to the DASD array 400 and/or to the other SVC 200.

Although the embodiments of the SAS Controller 300 mentioned above include two PCI-X to SAS controllers 310, the SAS Controller 300 according to the present invention may also include one or more than two controller 310 in other embodiments thereof, depending on performance considerations, engineering considerations, and/or cost or market considerations. Those skilled in the art will know such adjustments and considerations can be easily accomplished without any difficulty.

Figure 7:
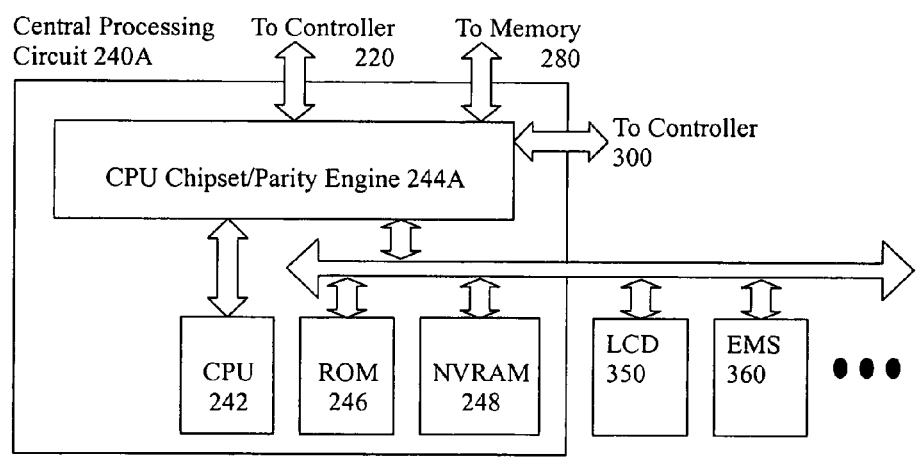
FIG. 7 shows a block diagram exemplifying the CPC according to the present invention and the connection thereof to other functional blocks of the SVC.

FIG. 7 shows a block diagram exemplifying the CPC 240 according to the present invention and the connection thereof to other functional blocks of the SVC 200.

In FIG. 7, the first embodiment of the CPC block is shown as the CPC 240A, comprising the CPU chipset/parity engine 244A, the CPU 242, a ROM (Read Only Memory) 246, a NVRAM (Non-volatile RAM) 248, an LCD 350 and an enclosure management service circuitry (EMS) 360. The CPU 242 can be, e.g., a Power PC CPU.

The ROM 246 can be a FLASH memory for storing BIOS and/or other programs. The NVRAM 248 is provided for saving some information regarding the IO operation execution status of the disk which can be examined after an abnormal power shut-off event occurs and meanwhile the IO operation execution does not complete yet. LCD module 350 shows the operation of the subsystem. EMS 360 can control the power of the DASA array 400 and do some other management. The ROM 246, the NVRAM 248, the LCD 350 and the enclosure management service circuitry (EMS) 360 are connected to the CPU chipset/parity engine 244A through an X-bus. The CPU chipset/parity engine 244A is a CPU chipset implemented therein a parity engine. The parity engine implemented in the CPU chipset can perform parity functionality of a certain RAID level in response to the instruction of the CPU 242. Of course, the parity engine can be shut off and perform no parity functionality at all in some situations, for example, in a RAID level 0 case. Alternatively, the CPU chipset and parity engine 244A can be implemented as two separate chips.

In a further embodiment, the parity engine is omitted. The CPC 240 can do without a parity engine if such functionality is not required by the SVC 200 or SVS 20. For example, for a JBOD emulator controller without parity functions or a subsystem thereof, or, a RAID level 1 controller or a subsystem thereof, no parity functionality is required, and thus parity functionality can be omitted. In another scenario, where the parity function is performed by the CPU 242 which executes some parity function programs or codes rather than by a dedicated hardware like a parity engine, parity engine can be omitted. This could be a low performance but low cost solution for the parity functionality.

In still a further embodiment of the CPC 240, a data protection engine which can perform a data protection function more than and/or other than a parity function can be provided. For example, the data protection engine may have an ECC (error correcting code) function.

In still a further embodiment of the CPC 240, the ROM 246 is embedded made in the CPU chipset/ROM chip. Or, the ROM is integrally provided in the CPU chipset/ROM chip.

In still a further embodiment of the CPC 240, CPU is embedded made in the embedded CPU/CPU chipset chip.

FIG. 7 and the above only show a few variations exemplifying the CPC 240, other variations and/or modifications which can be easily made by those skilled in the art, should be considered as a portion of the present invention. For example, according to the trend of SOC (System On Chip), all the functional blocks in the CPC 240 can be formed integrally in one chip or embedded in a single die.

The above-mentioned SVC 200 can be a RAID SVC which is configured to perform RAID functionality and used in a RAID SVS or a RAID head, which has no DASD array 400 attached inside for payload data. Alternatively, the above-mentioned SVC 200 can be a JBOD SVC which is configured to perform JBOD functionality and used in a JBOD SVS.

Alternatively, in a JBOD SVS, the JBOD SVC can be an expanding circuit including a micro-processor rather than a CPU.

Figure 3A:
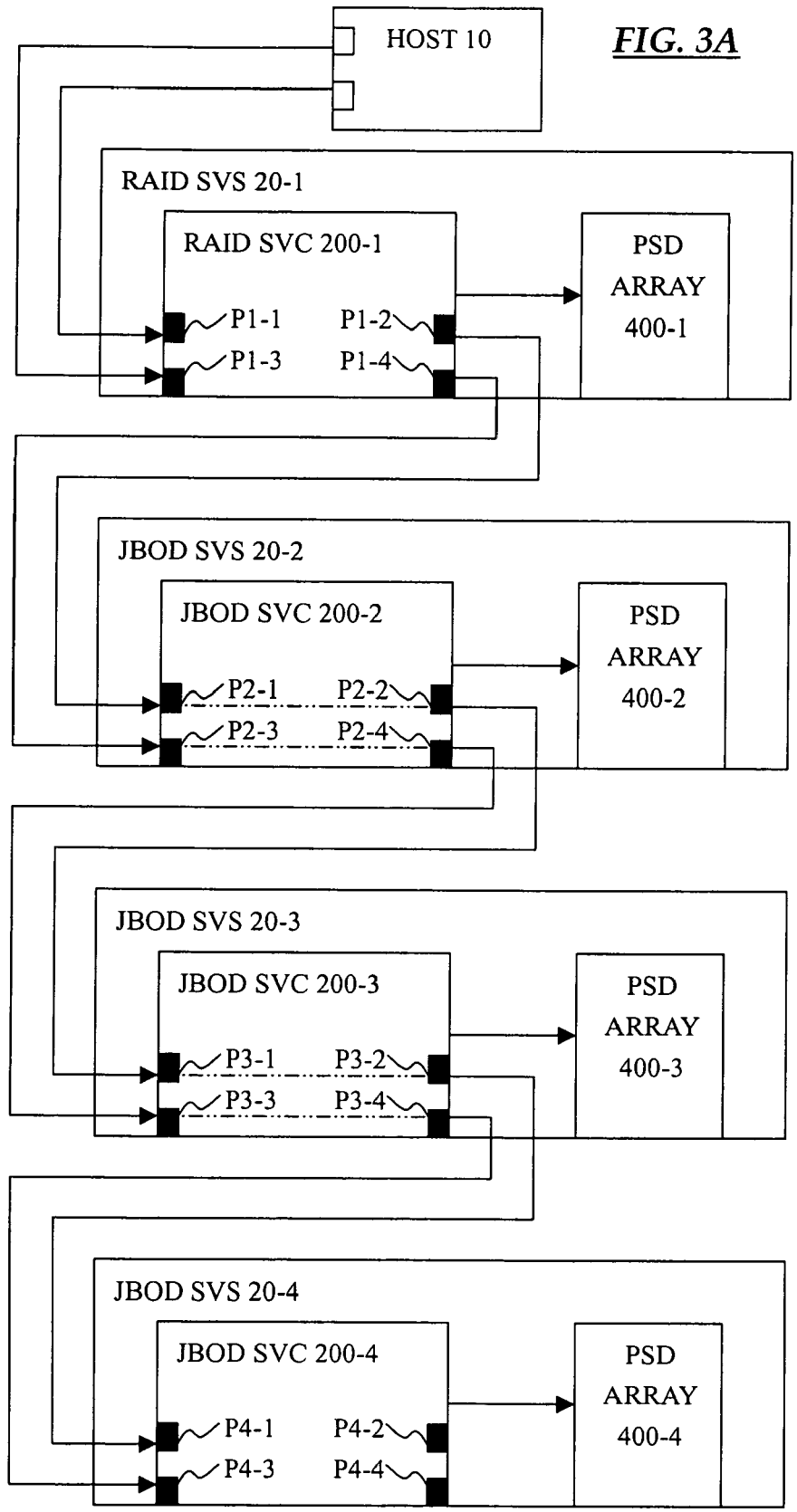
FIG. 3A is a SVS architecture configuration according to an embodiment of the present invention.

Please refer to FIG. 3A, in which an embodiment of the SVS architecture configuration according to the present invention is shown. The SVS architecture comprises a RAID SVS 20-1 and a plurality of JBOD SVSs 20-2, 20-3, and 20-4 connected to the RAID SVS 20-1. Noticed that, in another embodiments, there can be any numbers, at least two, of the SVSs 20 constructing the SVS architecture and each SVS 20 can be a RAID SVS, a RAID head, or a JBOD SVS, although FIG. 3A takes three JOBD SVSs 20-2, 20-3 and 20-4 subsequently attached to the RAID SVS 20-1 in order as an example for the following description. If the SVS 20 is a RAID SVS or a JBOD SVS, it comprises a SVC 200 and a PSD (Physical Storage Device) array 400 (to be the DASD array 400) attached thereto for providing data storage space, while a RAID head comprises a SVC 200 with no PSD array 400 attached.

In FIG. 3A, the RAID SVS 20-1 comprises a RAID SVCs 200-1 for performing RAID functionality of RAID levels 0, 1, 2, 3, 4, 5, or, 6, or their combinations. The RAID SVCs 200-1 comprises a pair of ports P1-1 and P1-3 for connecting to a host entity 10, a pair of ports P1-2 and P1-4 for connecting to a subsequent JBOD SVS 20-2, and ports for connecting to the PSD array 400-1.

Each of the JBOD SVSs 20-2, 20-3, and 20-4 comprises a JBOD SVC 200-2, 200-3, and 200-4, respectively. The JBOD SVC 200-2, 200-3, and 200-4 comprises a pair of ports P2-1 and P2-3, P3-1 and P3-3, and P4-1 and P4-3, respectively, for connecting to an antecedent SVS 20, a pair of ports P2-2 and P2-4, P3-2 and P3-4, and, P4-2 and P4-4 for connecting to a subsequent JBOD SVS 20, respectively, and ports for connecting to the PSD array 400, as shown in FIG. 3A.

The SVS 20-1 is connected to the host entity 10, with two ports P1-1, P1-3 of SVC 200-1 connected to a first and a second host port of the host entity 10, respectively. The host entity 10 can be a host computer or a host SVC. The PSD array 400-1 is attached to the SVC 200-1.

The SVS 20-1 is connected to the SVS 20-2 with two ports P1-2, P1-4 of the SVC 200-1 connecting to the two ports P2-1, P2-3 of the SVC 200-2, respectively. The PSD array 400-2 is attached to the SVC 200-2.

The SVS 20-2 is connected to the SVS 20-3 with two ports P2-2, P2-4 of the SVC 200-2 connecting to two ports P3-1, P3-3 of the SVC 200-3, respectively. The PSD array 400-3 is attached to the SVC 200-3.

The SVS 20-3 is connected to the SVS 20-4 with two ports P3-2, P3-4 of the SVC 200-3 connecting to two ports P4-1, P4-3 of the SVC 200-4, respectively. The PSD array 400-4 is attached to the SVC 200-4.

Although in the example of FIG. 3A, the ports P4-2, P4-4 are left unused, it is noted that the ports P4-2, P4-4 can be used for further connecting to another SVS 20.

The SVS architecture is configured such that two separate data access paths are formed and interconnects are built among the SVSs. The first path is formed by the interconnects, and the ports P1-2, P2-1, P2-2, P3-1, P3-2, P4-1 and the internal circuitry of the SVCs 200-1, 200-2, 200-3, 200-4, while the second path is formed by the interconnects, and the ports P1-4, P2-3, P2-4, P3-3, P3-4, P4-3 and the internal circuitry of the SVCs 200-1, 200-2, 200-3, 200-4. Should one of the paths be blocked or broken or failed, the other can be taken to access the data/information in the SVS architecture by the RAID SVS 20-1. When an IO instruction is issued by the RAID SVC 200-1 to the JBOD SVS 20-2, 20-3, or 20-4, for example, in response to a host IO command, one of the data access paths will be taken to send the IO instruction. The IO instruction will go along the taken path in a sequence the SVSs are connected in the path until the destination SVS is reached.

Although there are one RAID SVS 20-1 and three JBOD SVSs 20-2, 20-3, and 20-4 shown in FIG. 3A, there can be any numbers (totally at least two) and types (including RAID SVS, RAID head, and JBOD SVS) of the SVSs 20 constructing the present SVS architecture.

The above-mentioned SVS architecture, though redundantly configured to have two separate paths for accessing data, has a shortcoming that when one SVS 20 is off-lined, none of the SVSs 20 attached after the off-lined SVS 20 can be accessed. Some possible causes for the off-lining of the SVS 20 could be that the SVS 20 failed or malfunctioned or that the SVS 20 is off-lined for maintenance causes. For example, when the SVS 20-2 is off-lined, we not only lose the access to SVS 20-2 but also lose the access to SVSs 20-3 and 204.

Figure 3B:
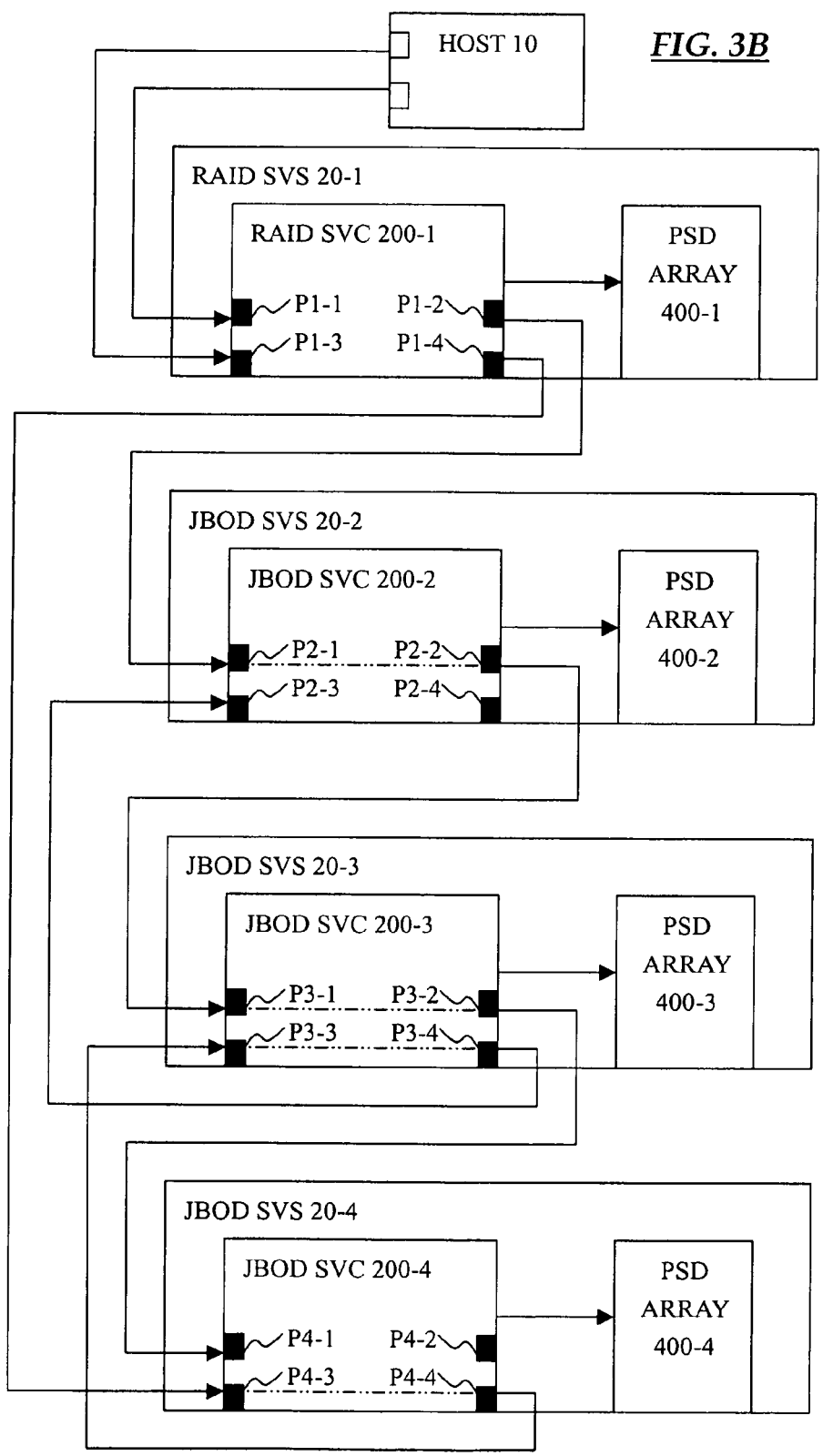
FIG. 3B is a SVS architecture configuration according to a further embodiment of the present invention.

Please refer to FIG. 3B, in which another embodiment of the subsystem architecture configuration according to the present invention is shown. The subsystem architecture comprises at least two SVSs 20 connected in a way different from the one shown in FIG. 3A, and each SVS 20 can be a RAID SVS, a RAID head, or a JBOD SVS. FIG. 3B shows an example of a RAID SVS 20-1 and a plurality of JBOD SVSs 20-2, 20-3, and 20-4 connected to the RAID SVS 20-1.

In the example of FIG. 3B, each SVS 20 comprises a SVC 200 and a PSD array 400 attached thereto for providing data storage space. The RAID SVS 20-1 comprises a RAID SVCs 200-1 for performing RAID functionality of RAID levels 0, 1, 2, 3, 4, 5, or, 6, or their combinations. The RAID SVC 200-1 comprises a pair of ports P1-1 and P1-3 for connecting to a host entity 10, a pair of ports P1-2 and p 1-4 for connecting to a subsequent JBOD SVS 20-2, and ports for connecting to the PSD array 400-1.

Each of the JBOD SVSs 20-2, 20-3, and 20-4 comprises a JBOD SVC 200-2, 200-3, and 200-4, respectively. The JBOD SVC 200-2, 200-3, and, 200-4 comprises a pair of ports P2-1 and P2-3, P3-1 and P3-3, and, P4-1 and P4-3, respectively, for connecting to an antecedent SVS 20, a pair of ports P2-2 and P2-4, P3-2 and P3-4, and, P4-2 and P4-4, respectively, for connecting to a subsequent JBOD SVS, and ports for connecting to the PSD array 400, as shown in FIG. 3B.

The SVS 20-1 is connected to the host entity 10 with two ports P1-1, P1-3 of SVC 200-1 connected to a first and a second host port of the host entity 10, respectively. The host entity 10 can be a host computer or a host SVC. The PSD array 400-1 is attached to the SVC 200-1.

In the present embodiment of FIG. 3B, although each of the SVSs 20 is the same as the one in FIG. 3A, the configurations of the two SVS architectures are different; that is, the connection structure among the SVSs in FIG. 3B is different from the one in FIG. 3A.

The SVS 20-1 is connected to the SVS 20-2 and SVS 20-4 with two ports P1-2, P1-4 of the SVC 200-1 connected to two ports P2-1, P4-3 of the SVC 200-2, SVC 200-4, respectively. The PSD array 400-2 is attached to the SVC 200-2.

The SVS 20-2 is also connected to the SVS 20-3 with two ports P2-2, P2-3 of the SVC 200-2 connected to two ports P3-1, P3-4 of the SVC 200-3, respectively. The PSD array 400-3 is attached to the SVC 200-3.

The SVS 20-3 is also connected to the SVS 20-4 with two ports P3-2, P3-3 of the SVC 200-3 connected to two ports P4-1, P4-4 of the SVC 200-4, respectively. The PSD array 400-4 is attached to the SVC 200-4.

Although in the present embodiment, the ports P2-4, P4-2 are left unused, it is noted that the ports P2-4, P4-2 can be used for further connecting to another SVS 20.

The SVS architecture is configured such that two separate data access paths are formed and interconnects are built among the SVSs. The first path is formed by the interconnects, and the ports P1-2, P2-1, P2-2, P3-1, P3-2, P4-1 and the internal circuitry of the SVCs 200-1, 200-2, 200-3, 200-4, while the second path is formed by the interconnects, and the ports P1-4, P4-3, P4-4, P3-3, P3-4, P2-3 and the internal circuitry of the SVCs 200-1, 200-2, 200-3, 200-4. Should one of the paths be blocked or broken or failed, the other can be taken to access the data/information in the SVS architecture by the RAID SVS 20-1. When an IO instruction is issued by the RAID SVC 200-1 to the JBOD SVS 20-2, 20-3, or 20-4, for example, in response to a host IO command, one of the data access paths will be taken to send the IO instruction. The IO instruction will go along the taken path in a sequence the SVSs are connected in the path until the destination SVS is reached.

Although there are one RAID SVS 20-1 and three JBOD SVSs 20-2, 20-3, and 20-4 shown in FIG. 3B, there can be any numbers (totally at least two) and types (including RAID SVS, RAID head, and JBOD SVS) of the SVSs 20 constructing present SVS architecture.

Compared with the configuration shown in FIG. 3A, the above-mentioned SVS architecture configuration has an advantage that when one of the JBOD SVS 20-2, 20-3, and, 20-4 is off-lined, other JBOD SVSs 20 can still be accessed. For example, when the SVS 20-2 is off-lined, we only lose the access to SVS 20-2 while the SVSs 20-3 and 20-4 can still be accessed.

This is because the two data access paths are configured in different connection sequences in this SVS architecture; that is, the first sequence of connection of the SVSs 20 in the first path is different from that of the second sequence of connection of the SVSs 20 in the second path. In the first path, the JBOD SVSs 20-2, 20-3, and 20-4 are connected to the RAID SVS 20-1 in the sequence of JBOD SVS 20-2 first, JBOD SVS 20-3 next, and finally, JBOD SVS 20-4, while in the second path, the JBOD SVSs 20-2, 20-3, and 20-4 are connected to the RAID SVS 20-1 in the sequence of JBOD SVS 20-4 first, JBOD SVS 20-3 next, and finally, JBOD SVS 20-2, which is completely opposite to the first sequence.

Figure 4A:
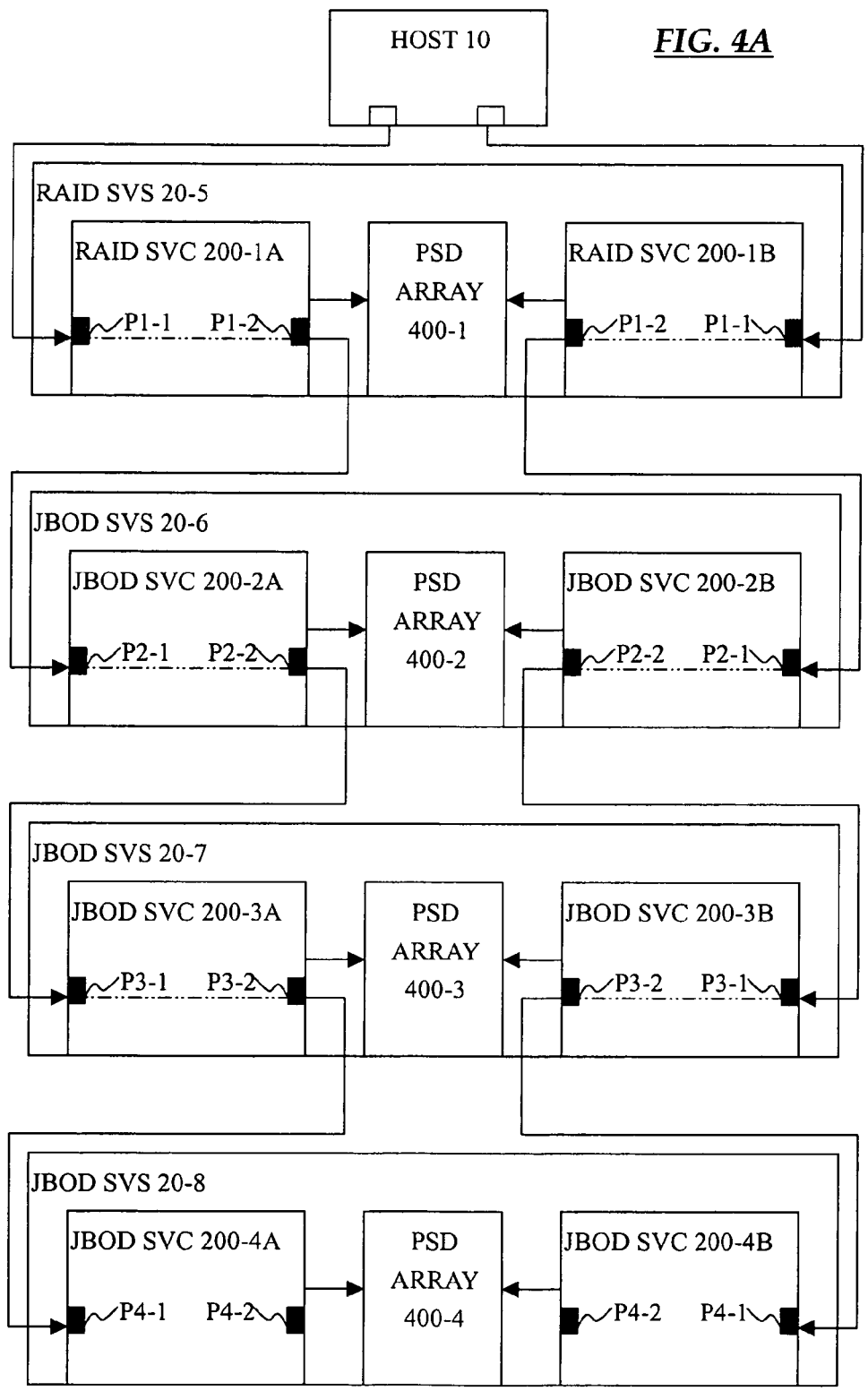
FIG. 4A is a SVS architecture configuration according to another embodiment of the present invention.

Please refer to FIG. 4A, in which another embodiment of the SVS architecture configuration according to the present invention is shown. The SVS architecture comprises at least two SVSs 20, each of which has a pair of SVCs 200 configured redundantly, connected in specific sequences and each SVS 20 can be a RAID SVS, a RAID head, or a JBOD SVS. FIG. 4A shows an example of a RAID SVS 20-5 and a plurality of JBOD SVSs 20-6, 20-7, and 20-8 connected to the RAID SVS 20-5 in order.

In the example of FIG. 4A, the RAID SVS 20-5 comprises a pair of RAID SVCs 200-1A and 200-1B for performing RAID functionality of RAID levels 0, 1, 2, 3, 4, 5, or, 6, or their combinations. The RAID SVCs 200-1A and 200-1B are configured redundantly such that either of the SVCs 200-1A and 200-1B will take over all the operations originally performed by the alternate of the SVCs 200-1B and 200-1A should the alternate SVCs 200 malfunction or fail. Each of the RAID SVCs 200-1A and 200-1B comprises a port for connecting to a host entity 10, a port for connecting to a subsequent JBOD SVS 20-6, and ports for connecting to the PSD array 400-1.

Each of the JBOD SVSs 20-6, 20-7, and 20-8 comprises a pair of JBOD SVCs 200. The JBOD SVC 200 comprises a port for connecting to an antecedent SVS 20, a port for connecting to a subsequent JBOD SVS, and ports for connecting to the PSD array 400, as shown in FIG. 4A.

The SVS 20-5 is connected to the host entity 10, with the port P1-1 of SVC 200-1A connected to a first host port of the host entity 10 and the port P1-1 of SVC 200-1B connected to a second host port of the host entity 10. The host entity 10 can be a host computer or a host SVC. The PSD array 400-1 is attached to both the SVCs 200-1A and 200-1B.

The SVS 20-5 is connected to the SVS 20-6, with a port P1-2 of the SVC 200-1A connected to a port P2-1 of the SVC 200-2A, and a port P1-2 of the SVC 200-1B connected to a port P2-1 of the SVC 200-2B. The PSD array 400-2 is attached to both the SVCs 200-2A and 200-2B.

The SVS 20-6 is connected to the SVS 20-7, with a port P2-2 of the SVC 200-2A connected to a port P3-1 of the SVC 200-3A, and a port P2-2 of the SVC 200-2B connected to a port P3-1 of the SVC 200-3B. The PSD array 400-3 is attached to both the SVCs 200-3A and 200-3B.

The SVS 20-7 is connected to the SVS 20-8, with a port P3-2 of the SVC 200-3A connected to a port P4-1 of the SVC 200-4A and a port P3-2 of the SVC 200-3B connected to a port P4-1 of the SVC 200-4B. The PSD array 400-4 is attached to both the SVCs 200-4A and 200-4B.

Although in the present embodiment, the ports P4-2 of the SVCs 200-4A and 200-4B are left unused, it is noted that the ports P4-2 can be used for further connecting to another SVS 20.

The SVS architecture is configured such that two separate data access paths are formed and interconnects are built among the SVSs 20. The first path is formed by the interconnects, and the ports and the internal circuitry of the SVCs 200-1A, 200-2A, 200-3A, and 200-4A, while the second path is formed by the interconnects, and the ports and the internal circuitry of the SVCs 200-1B, 200-2B, 200-3B, and 200-4B. Should one of the paths be blocked or broken or failed, the other can be taken to access the data/information in the SVS architecture by the RAID SVS 20-5. When an IO instruction is issued from the RAID SVS 20-5 to the JBOD SVS 20-6, 20-7, or 20-8, for example, in response to the host IO command, one of the data access paths will be taken to send the IO associated instruction(s). The IO instruction will go along the taken path in a sequence the SVSs 20 are connected in the path until the destination SVS 20 is reached.

Although there are one RAID SVS 20-5 and three JBOD SVSs 20-6, 20-7, and 20-8 shown in FIG. 4A, there can be any numbers (totally at least two) and types (including RAID SVS, RAID head, and JBOD SVS) of the SVSs 20 constructing the present SVS architecture.

Comparing to the embodiment of FIG. 3A, the present embodiment has the advantage that because two SVCs 200-1 are provided in the SVS 20-5, should either of the SVCs 200-1A and 200-1B be off-lined, access to or through the SVS 20-5 can be accomplished by the other SVC 200-1B and 200-1A. Similarly, should either of the redundant SVC pair in any of the SVSs 20-6, 20-7, and 20-8 be off-lined, the SVS 20-6, 20-7, or 20-8 can still be accessed. In addition, since the redundancy is accomplished by providing two different paths where the first path is going through a first set of the SVCs 200 in the SVSs 20 and the second path is going through a second set of the SVCs 200 other than the first SVC set, only half of receiving ports is provided in a SVC 200, which lowers the cost of a SVC 200. Furthermore, when cost is a critical concern in the market, as it always will be sooner or later, the redundancy according to the present invention can be accomplished by providing only two paths in the SVS architecture, with one path passing through the first set of SVCs, SVCs 200-1A, 200-2A, 200-3A, and 200-4A, and the other path passing through the second set of SVCs, SVCs 200-1B, 200-2B, 200-3B, and 200-4B, as can be seen in FIG. 4A.

The above-mentioned subsystem architecture, though including a pair of redundantly configured SVCs 200 in order to have two separate paths for accessing data, still has the shortcoming that when one SVS 20 is off-lined, none the SVSs 20 attached after the off-lined SVS 20 can be accessed. For example, when the SVS 20-6 is off-lined due to some reasons, the host entity IO and the RAID SVS 20-5 will lose access to both SVSs 20-7 and 20-8.

Figure 4B:
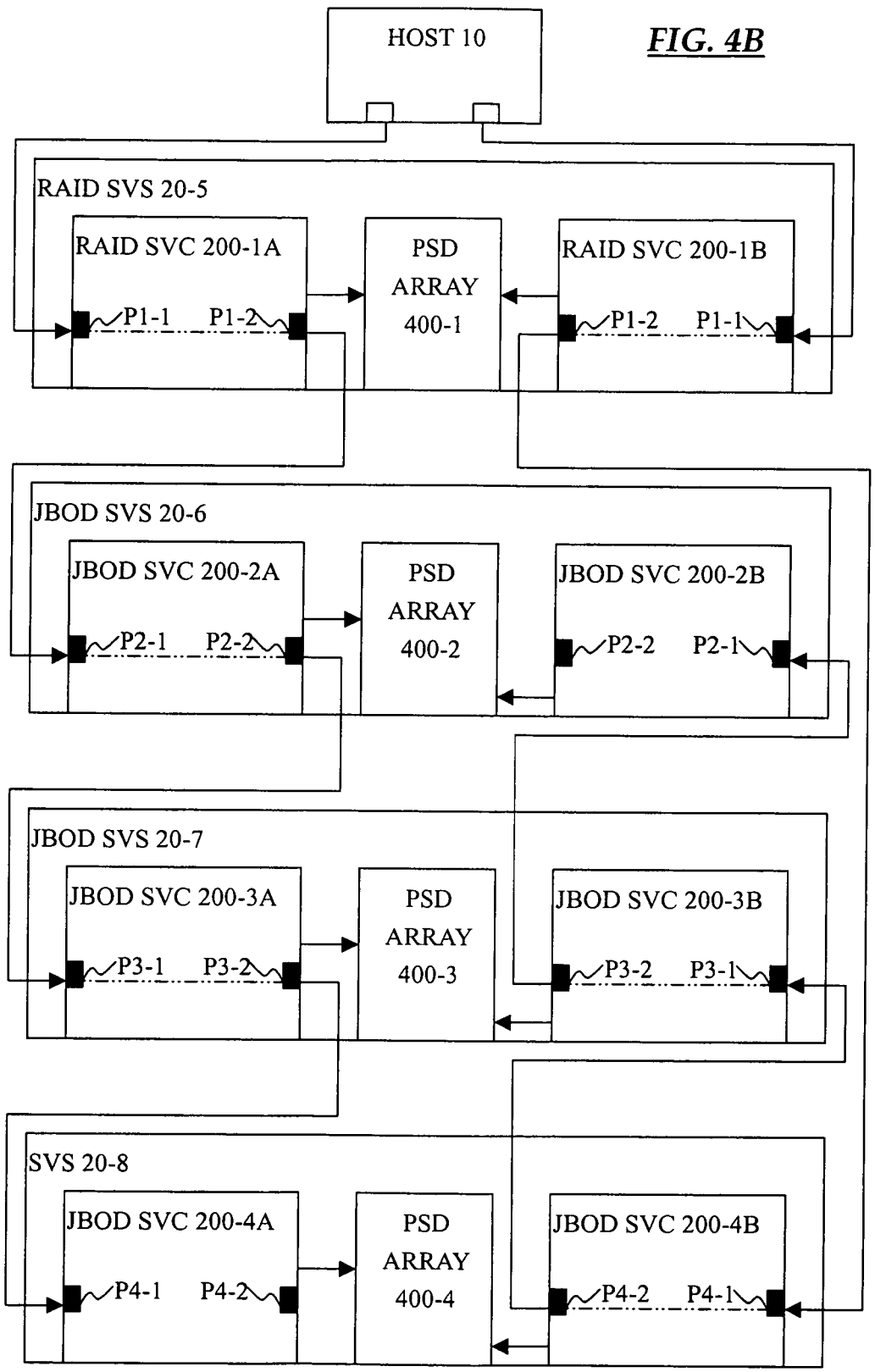
FIG. 4B is a SVS architecture configuration according to still another embodiment of the present invention.

Please refer to FIG. 4B, in which another embodiment of the SVS architecture configuration according to the present invention is shown. The SVS architecture comprises at least two SVSs 20, each of which has a pair of SVCs 200 configured redundantly, connected in sequences different from the ones shown in FIG. 4A, and each SVS 20 can be a RAID SVS, a RAID head, or a JBOD SVS. FIG. 4B shows an example of a RAID SVS 20-5 and a plurality of JBOD SVSs 20-6, 20-7, and 20-8 connected to the RAID SVS 20-5.

In the example of FIG. 4B, the RAID SVS 20-5 comprises a pair of RAID SVCs 200-1A and 200-1B for performing RAID functionality of RAID levels 0, 1, 2, 3, 4, 5, or, 6, or their combinations. The RAID SVCs 200-1A and 200-1B are configured redundantly such that either of the SVCs 200-1A and 200-1B will take over all the operations originally performed by the alternate of the SVCs 200-1B and 200-1A, should the alternate SVCs malfunction or fail. Each of the RAID SVCs 200-1A and 200-1B comprises a port for connecting to a host entity 10, a port for connecting to a subsequent JBOD SVS 20, and ports for connecting to the PSD array 400.

Each of the JBOD SVSs 20-6, 20-7, and 20-8 comprises a pair of JBOD SVCs 200. Each JBOD SVC 200 comprises a port for connecting to an antecedent SVS 20, a port for connecting to a subsequent JBOD SVS 20, and ports for connecting to the PSD array 400, as shown in FIG. 4B.

The SVS 20-5 is connected to the host entity 10 with the port P1-1 of SVC 200-1A connected to a first host port of the host entity 10 and the port P1-1 of SVC 200-1B connected to a second host port of the host entity 10. The host entity 10 can be a host computer or a host SVC. The PSD array 400-1 is attached to both the SVCs 200-1A and 200-1B.

In the present embodiment of FIG. 4B, although each of the SVSs 20 is the same as the one in FIG. 4A, the configurations of the two SVS architectures are different; that is, the connection structure among the SVSs in FIG. 4B is different from the one in FIG. 4A.

The SVS 20-5 is also connected to SVSs 20-6 and 20-8, with one interconnect provided between the SVC 200-1A of the SVS 20-5 and the SVC 200-2A of the SVS 20-6 and the other interconnect provided between the SVC 200-1B of the SVS 20-5 and the SVC 200-4B of the SVS 20-8.

The SVS 20-6 is connected to the SVS 20-7 with one interconnect provided between the SVC 200-2A of the SVS 20-6 and the SVC 200-3A of the SVS 20-7 and the other interconnect provided between the SVC 200-2B of the SVS 20-6 and the SVC 200-3B of the SVS 20-7.

The SVS 20-7 is connected to the SVS 20-8 with one interconnect provided between the SVC 200-3A of the SVS 20-7 and the SVC 200-4A of the SVS 20-8 and the other interconnect provided between the SVC 200-3B of the SVS 20-7 and the SVC 200-4B of the SVS 20-8.

The SVC 200-1A is connected to the SVC 200-2A with a port P1-2 of the SVC 200-1A connecting to a receiving port P2-1 of the SVC 200-2A.

The SVC 200-1B is connected to the SVC 200-4B with a port P1-2 of the SVC 200-1B connecting to a receiving port P4-1 of the SVC 200-4B.

The SVC 200-2A is connected to the SVC 200-3A with a port P2-2 of the SVC 200-2A connecting to a receiving port P3-1 of the SVC 200-3A.

The SVC 200-3A is connected to the SVC 200-4A with a port P3-2 of the SVC 200-3A connecting to a receiving port P4-1 of the SVC 200-4A.

The SVC 200-4B is connected to the SVC 200-3B with a port P4-2 of the SVC 200-4B connecting to a receiving port P3-1 of the SVC 200-3B.

The SVC 200-3B is connected to the SVC 200-2B with a port P3-2 of the SVC 200-3B connecting to a receiving port P2-1 of the SVC 200-2B.

The PSD arrays 400-2 are attached to both the SVCs 200-2A and 200-2B. The PSD arrays 400-3 are attached to both the SVCs 200-3A and 200-3B. The PSD arrays 400-3 are attached to both the SVCs 200-4A and 200-4B.

Although in the present example shown in FIG. 4B, the port P4-2 of the SVC 200-4A and the port P2-2 of the SVC 200-2B are left unused, it is noted that the ports P4-2 and P2-2 can be used for further connecting to another SVS 20, if necessary.

The SVS architecture is configured such that two separate data access paths are formed and interconnects are built among the SVSs 20. The first path is formed by the interconnects, and the ports and the internal circuitry of the SVCs 200-1A, 200-2A, 200-3A, and 200-4A in order, while the second path is formed by the interconnects, and the ports and the internal circuitry of the SVCs 200-1B, 200-4B, 200-3B, and 200-2B in order. Should one of the paths be blocked or broken or failed, the other can be taken to access the data/information in the SVS architecture by the RAID SVS 20-5. When an IO instruction is issued from the RAID SVS 20-5 to the JBOD SVS 20-6, 20-7, or 20-8, for example, in response to the host IO command, one of the data access paths will be taken to send the IO associated instruction(s). The IO instruction will go along the taken path in a sequence the SVSs 20 are connected in the path until the destination SVS 20 is reached.

Although there are one RAID SVS 20-5 and three JBOD SVSs 20-6, 20-7, and 20-8 shown in FIG. 4B, there can be any numbers (totally at least two) and types (including RAID SVS, RAID head, and JBOD SVS) of the SVSs 20 constructing the present SVS architecture.

Comparing to the embodiment of FIG. 4A, the above-mentioned SVS architecture configuration, has an advantage that when one JBOD SVS 20 is off-lined, other JBOD SVSs 20 can still be accessed. For example, when the SVS 20-6 is off-lined, we only lose the access to SVS 20-6 while the SVSs 20-7 and 20-8 can still be accessed.

This is because the two data access paths are configured in different connection sequences in the SVS architecture; that is, the first sequence of connection of the SVSs 20 in the first path is different from the second sequence of connection of the SVSs 20 in the second path. In the first path, the JBOD SVSs 20 are connected to the RAID SVS 20-5 in the sequence of the JBOD SVS 20-6 first, the JBOD SVS 20-7 next, and finally, the JBOD SVS 20-8, while in the second path, the JBOD SVSs 20 are connected to the RAID SVS 20-5 in the sequence of the JBOD SVS 20-8 first, the JBOD SVS 20-7 next, and finally, the JBOD SVS 20-6, which is completely opposite to the first sequence.

Still, when cost is a critical concern in the market, as it always will be sooner or later, the redundancy according to the present invention can be accomplished by providing only two paths in the SVS architecture, with one path passing through the first set of SVCs, SVCs 200-1A, 200-2A, 200-3A, and 200-4A, and the other path passing through the second set of SVCs, SVCs 200-1B, 200-2B, 200-3B, and 200-4B, as can be seen in FIG. 4B.

Figure 5A:
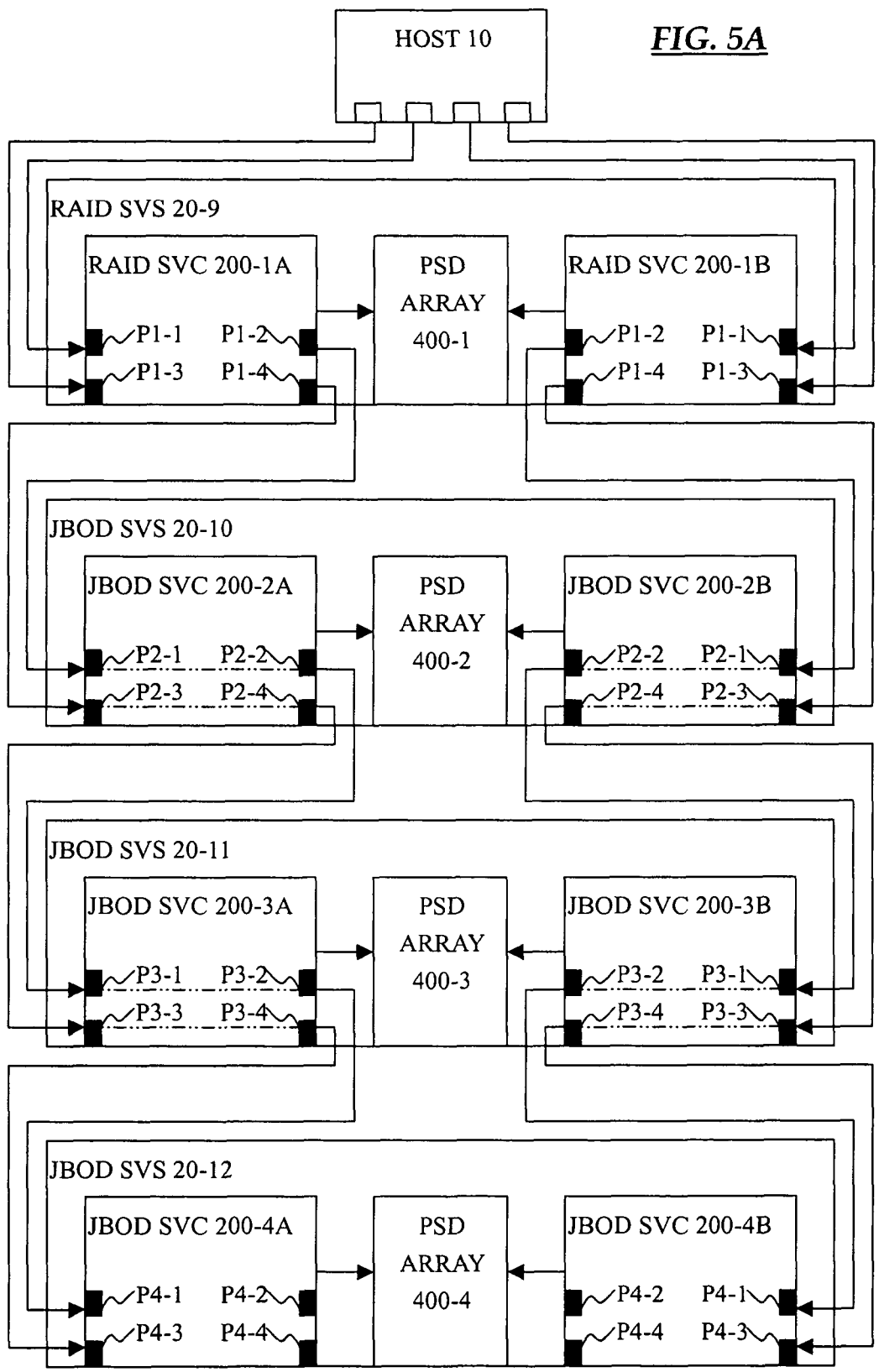
FIG. 5A is a SVS architecture configuration according to still another embodiment of the present invention.

Please refer to FIG. 5A, in which another embodiment of the SVS architecture configuration according to the present invention is shown. The SVS architecture comprises at least two SVSs 20, each of which has a pair of SVCs 200 configured redundantly, connected in specific sequences and each SVS 20 can be a RAID SVS, a RAID head, or a JBOD SVS. FIG. 5A shows an example of a RAID SVS 20-9 and a plurality of JBOD SVSs 20-10, 20-11, and 20-12 connected to the RAID SVS 20-9 in order.

In the example of FIG. 5A, the RAID SVS 20-9 comprises a pair of RAID SVCs 200-1A and 200-1B for performing RAID functionality of RAID levels 1, 2, 3, 4, 5, or, 6, or their combinations. The RAID SVCs 200-1A and 200-1B are configured redundantly such that either of the SVCs 200-1A and 200-1B will take over all the operations originally performed by the alternate of the SVCs 200-1B and 200-1A, should the alternate SVC malfunction or fail. Each of the RAID SVCs 200-1A and 200-1B comprises a pair of ports for connecting to a host entity 10, a pair of ports for connecting to a subsequent JBOD SVS 20, and ports for connecting to the PSD array 400.

Each of the JBOD SVSs 20-10, 20-11, and 20-12 comprises a pair of JBOD SVCs 200. The JBOD SVC 200 comprises a pair of ports for connecting to an antecedent SVS 20, a pair of ports for connecting to a subsequent JBOD SVS 20, and ports for connecting to the PSD array 400, as shown in FIG. 5A.

The SVS architecture comprises two sets of SVCs 200. The first set of the SVCs includes SVCs 200-1A, 200-2A, 200-3A, and 200-4A. The second set of the SVCs includes SVCs 200-1B, 200-2B, 200-3B, and 200-4B. In each of the first and second SVC sets, the SVCs 200 are connected in the same way as that of the SVCs 200 shown in FIG. 3A.

The SVS 20-9 is connected to the host entity 10 with the ports P1-1 and P1-3 of the SVC 200-1A connected to a first and a second host port of the host entity 10, respectively, and the ports P1-1, P1-3 of the SVC 200-1B connected to a third and a fourth host port of the host entity 10, respectively. The host entity 10 can be a host computer or a host SVC. The PSD array 400-1 is attached to both the SVCs 200-1A and 200-1B.

The SVS 20-9 is connected to the SVS 20-10 with ports P1-2 and P1-4 of the SVC 200-1A connected to ports P2-1 and P2-3 of the SVC 200-2A, respectively, and ports P1-2 and P1-4 of the SVC 200-1B connected to ports P2-1 and P2-3 of the SVC 200-2B, respectively. The PSD array 400-2 is attached to both the SVCs 200-2A and 200-2B.

The SVS 20-10 is connected to the SVS 20-11 with ports P2-2 and P2-4 of the SVC 200-2A connected to ports P3-1 and P3-3 of the SVC 200-3A, respectively, and ports P2-2 and P2-4 of the SVC 200-2B connected to ports P3-1 and P3-3 of the SVC 200-3B, respectively. The PSD array 400-3 is attached to both the SVCs 200-3A and 200-3B.

The SVS 20-11 is connected to the SVS 20-12 with ports P3-2 and P3-4 of the SVC 200-3A connected to ports P4-1 and P4-3 of the SVC 200-4A, respectively, and ports P3-2 and P3-4 of the SVC 200-3B connected to ports P4-1 and P4-3 of the SVC 200-4B, respectively. The PSD array 400-4 is attached to both the SVCs 200-4A and 200-4B.

Although in the present embodiment, the ports P4-2, P4-4 of the SVCs 200-4A and 200-4B are left unused, it is noted that the ports can be used for further connecting to another SVS 20.

The SVS architecture is configured such that four separate data access paths are formed among and connecting the SVSs, in which the first and the second paths are formed and interconnects are built among the SVCs 200-1A, 200-2A, 200-3A, and 200-4A while the third and the fourth are formed and interconnects are built among the SVCs 200-1B, 200-2B, 200-3B, and 200-4B.

The first path is formed by the interconnects, and the ports P1-2, P2-1, P2-2, P3-1, P3-2, P4-1 and the internal circuitry of the SVCs 200-1A, 200-2A, 200-3A, 2004A, while the second path is formed by the interconnects, and the ports P1-4, P2-3, P2-4, P3-3, P3-4, P4-3 and the internal circuitry of the SVCs 200-1A, 200-2A, 200-3A, 200-4A. Should one of the first and second paths be blocked or broken or failed, the other can be taken to access the data/information in the SVS architecture by the RAID SVS 20-9.

The third path is formed by the interconnects, and the ports P1-2, P2-1, P2-2, P3-1, P3-2, P4-1 and the internal circuitry of the SVCs 200-1B, 200-2B, 200-3B, 200-4B, while the fourth path is formed by the interconnects, and the ports P1-4, P2-3, P2-4, P3-3, P3-4, P4-3 and the internal circuitry of the SVCs 200-1B, 200-2B, 200-3B, 200-4B. Should one of the third and fourth paths be blocked or broken or failed, the other can be taken to access the data/information in the SVS architecture by the RAID SVS 20-9.

Although there are one RAID SVS 20-9 and three JBOD SVSs 20-10, 20-11, and 20-12 shown in FIG. 5A, there can be any numbers (totally at least two) and types (including RAID SVS, RAID head, and JBOD SVS) of the SVSs 20 constructing the present SVS architecture.

When the host entity 10 is connected with the SVS architecture, four separate paths can be taken to access the data/information in the SVS architecture by the host entity 10. Obviously, this SVS architecture is more robust than that of FIG. 3A or FIG. 4A. This SVS architecture, however, still has a shortcoming that when one SVS 20 is off-lined, none the SVSs 20 attached after the off-lined SVS 20 can be accessed. For example, when the SVS 20-10 is off-lined due to some reasons, the host entity 10 and the RAID SVS 20-9 will lose access to both SVSs 20-11 and 20-12. This is because that the connection sequences of the JBOD SVSs 20-10, 20-11, and 20-12 to the RAID SVS 20-9 in the four paths are all the same. Namely, the JBOD SVSs 20-10, 20-11, and 20-12 are connected to the RAID SVS 20-9 in the sequence of the JBOD SVS 20-10 first, the JBOD SVS 20-11 next, and finally, the JBOD SVS 20-12.

Figure 5B:
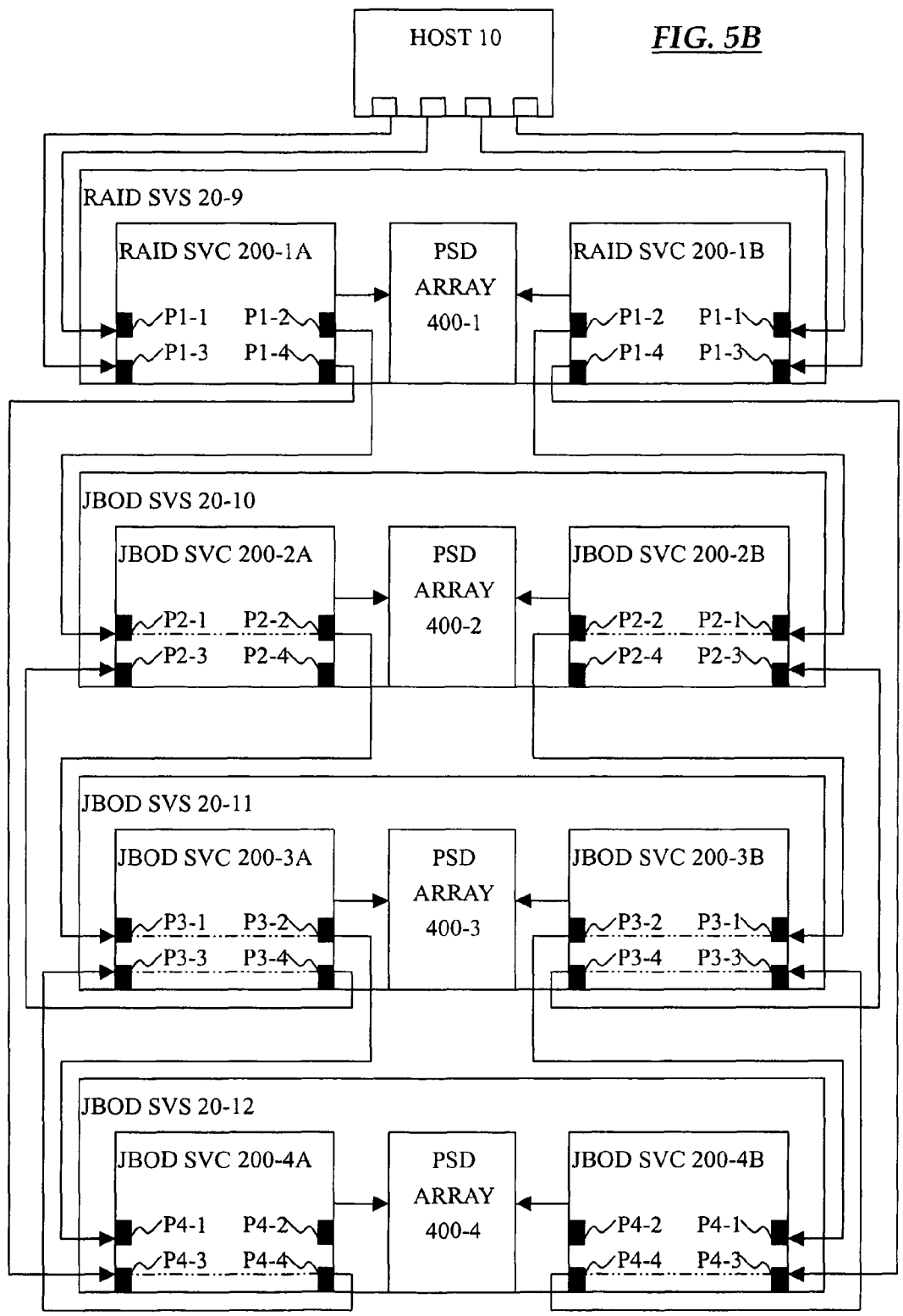
FIG. 5B is a SVS architecture configuration according to still another embodiment of the present invention.

Please refer to FIG. 5B, in which another embodiment of the SVS architecture configuration according to the present invention is shown. The SVS architecture comprises at least two SVSs 20, each of which has a pair of SVCs 200 configured redundantly, connected in sequences different from the ones in FIG. 5A, and each SVS 20 can be a RAID SVS, a RAID head, or a JBOD SVS. In the present embodiment, although each of the SVSs 20 are the same as the one of the SVSs 20 in FIG. 5A, the configurations of the two SVS architectures are different; that is, the different connection relationships of the SVSs 20 of the SVS architecture in FIG. 5B is different from the ones in FIG. 5A.

In the example of FIG. 5B, the SVS architecture comprises two sets of SVCs 200. The first set of the SVCs 200 includes SVCs 200-1A, 200-2A, 200-3A, and 200-4A. The second set of the SVCs includes SVCs 200-1B, 200-2B, 200-3B, and 200-4B. In each of the first and second SVC sets, the SVCs 200 are connected in the same way as that of the SVCs 200 shown in FIG. 3B. In each of the SVS 20, the PSD array 400 is connected to both of the SVCs 200 therein.

In each of the first and second SVC sets, the SVS architecture configuration is the same, except that the SVCs 200-1A, 200-2A, 200-3A and 200-4A for the first set of SVCs should be replaced by the SVCs 200-1B, 200-2B, 200-3B and 200-4B for the second set of SVCs. The SVS architecture configuration for the first set of SVCs is explained as follows.

The SVS 20-9 is connected to the SVS 20-10 and SVS 20-12 with two ports P1-2 and P1-4 of the SVC 200-1A connected to two ports P2-1 and P4-3 of the SVC 200-2A and SVC 200-4A, respectively.

The SVS 20-10 is connected to the SVS 20-11 with two ports P2-2 and P2-3 of the SVC 200-2A connected to two ports P3-1 and P3-4 of the SVC 200-3A, respectively.

The SVS 20-11 is connected to the SVS 20-12 with two ports P3-2 and P3-3 of the SVC 200-3A connected to two ports P4-1 and P4-4 of the SVC 200-4, respectively.

Although in the present embodiment, the ports P2-4 and P4-2 are left unused, it is noted that the ports 2-4 and P4-2 can be used for further connecting to another SVS 20.

The SVS architecture is configured such that four separate data access paths are formed and interconnects are built among the SVSs 20, in which the first and the second paths are formed and interconnects are built among the SVCs 200-1A, 200-2A, 200-3A, and 200-4A while the third and the fourth are formed and interconnects are built among the SVCs 200-1B, 200-2B, 200-3B, and 200-4B.

The first path is formed by the interconnects, and the ports P1-2, P2-1, P2-2, P3-1, P3-2, P4-1 and the internal circuitry of the SVCs 200-1A, 200-2A, 200-3A, 200-4A, while the second path is formed by the interconnects, and the ports P1-4, P4-3, P4-4, P3-3, P3-4, P2-3 and the internal circuitry of the SVCs 200-1A, 200-2A, 200-3A, 200-4A. Should one of the first and second paths be blocked or broken or failed, the other can be taken to access the data/information in the SVS architecture by the RAID SVS 20-9.

The third path is formed by the interconnects, and the ports P1-2, P2-1, P2-2, P3-1, P3-2, P4-1 and the internal circuitry of the SVCs 200-1B, 200-2B, 200-3B, 200-4B, while the fourth path is formed by the interconnects, and the ports P1-4, P4-3, P4-4, P3-3, P3-4, P2-3 and the internal circuitry of the SVCs 200-1B, 200-2B, 200-3B, 200-4B. Should one of the third and fourth paths be blocked or broken or failed, the other can be taken to access the data/information in the SVS architecture by the RAID SVS 20-9.

Although there are three JBOD SVSs 20 shown in FIG. 5B, there can be two or more than three JBOD SVSs 20 in the present SVS architecture.

In FIG. 5B, in the first and third paths, the JBOD SVSs 20 are connected to the RAID SVS 20-5 in the sequence of the JBOD SVS 20-10 first, the JBOD SVS 20-11 next, and finally, the JBOD SVS 20-12, while in the second and fourth paths, the JBOD SVSs 20 are connected to the RAID SVS 20-5 in the sequence of the JBOD SVS 20-12 first, the JBOD SVS 20-11 next, and finally, the JBOD SVS 20-10. Therefore, the SVS architecture configuration of the present embodiment in FIG. 5B has the advantage of providing different access paths to reach the JBOD SVS(s) 20 attached behind an off-lined one, and it is superior to the embodiment shown in FIG. 5A that all data access paths will be broken when one JBOD SVS 20 is off-lined. For example, the SVSs 20-11 and 20-12 can still be accessed via the second and fourth paths when the SVS 20-10 is off-lined, although the SVSs 20-11 and 20-12 cannot be accessed via the first and third paths.

In a further embodiment of the SVS architecture configuration of the present invention, which is not shown in the drawing figures, in each of the four data access paths, the SVSs 20 may have a different connecting sequence. For example, the SVSs 20 in the first data access path are connected in the order of the SVS 20-9 to the SVS 20-10 to the SVS 20-11 to the SVS 20-12, the SVSs 20 in the second data access path are connected in the order of the SVS 20-9 to the SVS 20-12 to the SVS 20-11 to the SVS 20-10, the SVSs 20 in the third data access path are connected in the order of the SVS 20-9 to the SVS 20-11 to the SVS 20-10 to the SVS 20-12, and the SVSs 20 in the fourth data access path are connected in the order of the SVS 20-9 to the SVS 20-10 to the SVS 20-12 to the SVS 20-11.

In another embodiment of the SVS architecture configuration of the present invention, which is not shown in the drawing figures, in some of the data access paths, the SVSs 20 may have the same connecting sequence, while in others, the SVSs 20 may have a different connecting sequence. For example, the SVSs 20 in the first and third data access paths are connected in the order of the SVS 20-9 to the SVS 20-10 to the SVS 20-11 to the SVS 20-12, while the SVSs 20 in the second data access path are connected in the order of the SVS 20-9 to the SVS 20-12 to the SVS 20-11 to the SVS 20-10, and the SVSs 20 in the fourth data access path are connected in the order of the SVS 20-9 to the SVS 20-11 to the SVS 20-10 to the SVS 20-12.

In the present embodiment, each of the JBOD SVSs 20 connected to the RAID SVS 20-9 has chances to be the first-attached SVS 20 attached to the RAID SVS 20-9 in the data access paths. In the first and third paths, the SVS 20-10 is the first SVS 20 connected to the SVS 20-9; in the second path, the SVS 20-12; and, in the fourth path, the SVS 20-11.

Figure 5C:
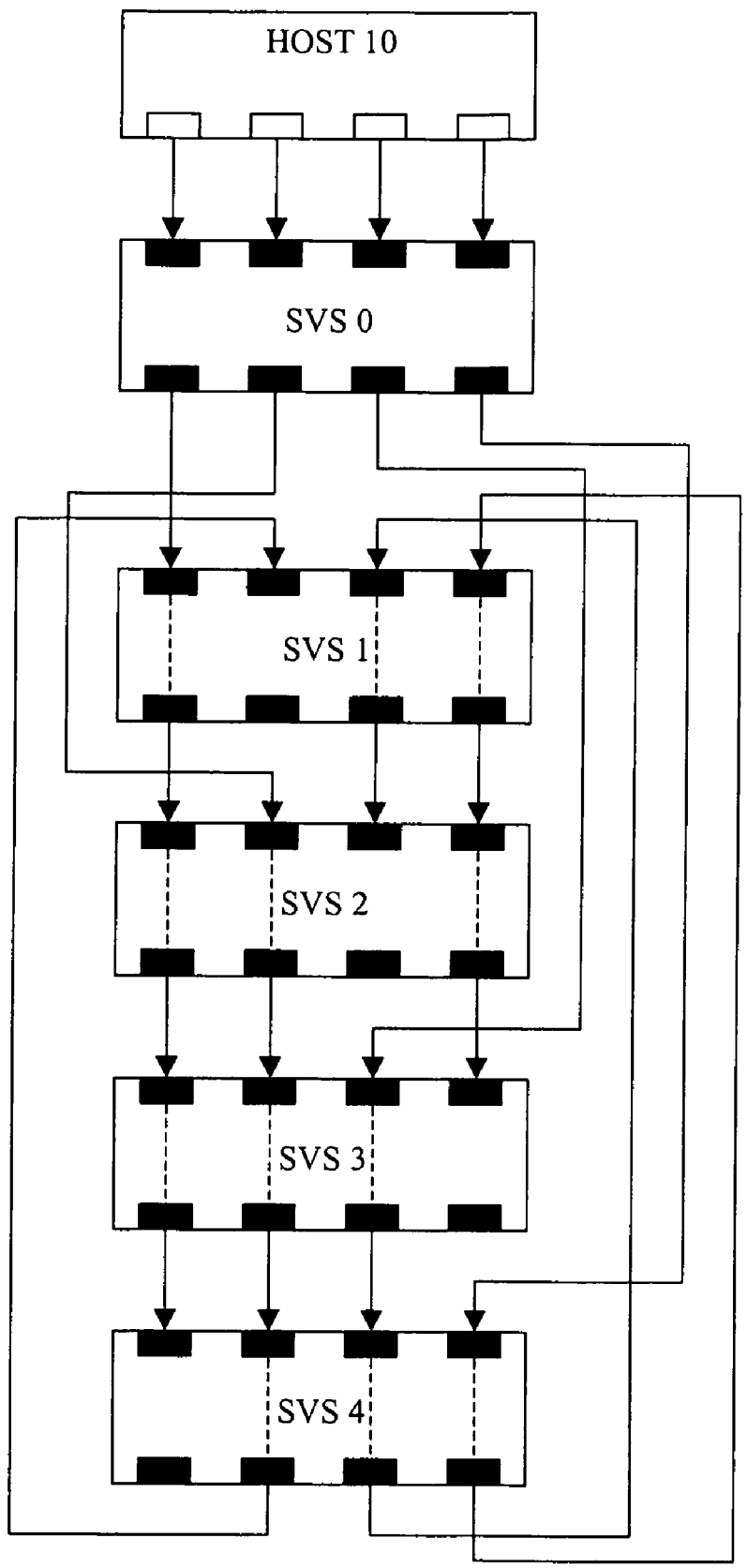
FIG. 5C is a SVS architecture configuration according to still another embodiment of the present invention.

In still another embodiment of the SVS architecture configuration of the present invention which is shown in FIG. 5C, in each of the data access paths, the first SVS attached to the head SVS is different. For example, in a SVS architecture comprising a RAID SVS 0 and four JBOD SVSs 1, 2, 3, and 4, four data access paths are configured with connection sequences as follows: in the first path, the SVS 0 to the SVS 1 to the SVS 2 to the SVS 3 to the SVS 4; in the second path, the SVS 0 to the SVS 2 to the SVS 3 to the SVS 4 to the SVS 1; in the third path, the SVS 0 to the SVS 3 to the SVS 4 to the SVS 1 to the SVS 2; and, in the four path, the SVS 0 to the SVS 4 to the SVS 1 to the SVS 2 to the SVS 3. Each of the SVSs may comprise one or more SVCs, and each of the SVCs may be connected to the PSD array of the SVS it belongs to. When two or more SVCs are contained in a SVS, the data access paths in a SVS can be configured to pass different SVCs.

Although in the above embodiments SAS protocol is used to implement the ports for connecting between the SVSs and the interconnects between the SVSs, it is noted that other protocols for serial signal transmission, such as fibre channel protocol, or SATA protocol, can also be used. In a SVS architecture using fibre channel JBODs, the SVC for the JBOD SVS can be a PBC (port bypass circuit). In a PBC, there is no CPU or micro-processor contained therein, or there is even no active component contained therein. In the present invention, such PBC used in a JBOD SVS for connecting the JBOD SVS with the other SVS is also defined as a SVC.

Although in the above embodiments, the first SVS 20 attached to the host entity 10 is a RAID SVS comprising a PSD array 400 therein and the following-attached SVSs 20 are JBOD SVSs with PSD arrays 400 as well, in another embodiments, any of which can be replaced by RAID heads whose function of such SVS is dedicated to providing RAID function and data flow control rather than to storing data therein.

Those skilled in the art will readily observe that numerous modifications and alternations of the device may be made while retaining the teaching of the invention. Accordingly, the above disclosure should be construed as limited only by the metes and bounds of the relevant claims.

What is claimed is:

1. A storage virtualization subsystem (SVS) architecture comprising a plurality of SVSs, each of the SVSs comprising at least one storage virtualization controller (SVC) which comprises a device-side IO device interconnect controller implemented complying with a serial attached SCSI (SAS) protocol; a first data access path and a second data access path are configured passing through the SVSs to form the SVS architecture; wherein the two data access paths are configured in a way that the SVSs in the first path are connected in a first sequence and the SVSs in the second path are connected in a second sequence different from the first sequence, so that a data path redundancy of the first data access path and the second data access path is achieved, and when one of the SVSs is off-lined such that an SVS which is among the SVSs and which is behind the off-lined SVS, can not be accessed by the first data access path, the SVS which is among the SVSs and which is behind the off-lined SVS can still be accessed by the second data access path.

2. The SVS architecture defined in claim 1, wherein types of the SVSs are redundant array of independent disks (RAID) SVSs, RAID head SVSs or just a bunch of drives (JBOD) SVSs, or combinations constructed by any two or three thereof.

3. The SVS architecture defined in claim 2, wherein the SVS further comprises a physical storage device (PSD) array attached to the at least one storage virtualization controller (SVC) when the SVS is the RAID SVS.

4. The SVS architecture defined in claim 2, wherein the SVS further comprises a PSD array attached to the at least one storage virtualization controller (SVC) when the SVS is the JBOD SVS.

5. The SVS architecture defined in claim 1, wherein the at least one storage virtualization controller (SVC) comprises only one SVC.

6. The SVS architecture defined in claim 5, wherein there are only two data access paths configured in the SVSs: the first and the second data access paths.

7. The SVS architecture defined in claim 1, wherein each of the SVSs comprises two SVCs including a first SVC and a second SVC, and both the SVCs are redundantly configured in the SVS, and the first data access path goes by the first SVCs of the SVSs and the second data access path goes by the second SVCs of the SVSs and wherein the SVS architecture further comprises a third data access path going by the first SVCs and a fourth data access path going by the second SVCs of the SVSs.

8. The SVS architecture defined in claim 1, wherein the first data access path connects the plurality of SVSs starting from a first SVS, then a second SVS, and going forwards in order till a last SVS, while the second data access path connects the plurality of SVSs starting from the first SVS, then jumping to the last SVS, and going backwards in order till the second SVS.

9. The SVS architecture defined in claim 8, wherein the first SVS is a RAID SVS or a RAID head, and the other SVSs are JBOD SVSs.

10. The SVS architecture defined in claim 1, wherein each of the SVSs comprises two SVCs, being a first SVC and a second SVC, and both the SVCs are redundantly configured in the SVS.

11. The SVS architecture defined in claim 10, wherein the first data access path goes by the first SVCs of the SVSs and the second data access path goes by the second SVCs of the SVSs.

12. The SVS architecture defined in claim 11, wherein the first data access path connects the plurality of SVSs starting from a first SVS, then a second SVS, and going forwards in order till a last SVS, while the second data access path connects the plurality of SVSs starting from the first SVS, then jumping to the last SVS, and going backwards in order till the second SVS.

13. The SVS architecture defined in claim 1, wherein the first and the second data access paths are configured in a rule that a first and a second SVS of the plurality of SVSs are respectively a starting SVS of the first and the second data access paths in the SVS architecture.

14. The SVS architecture defined in claim 1, wherein the device-side IO device interconnect controller contains at lease one SAS port.

15. A computer system implementing storage virtualization comprising:
a host computer and a storage virtualization subsystem (SVS) architecture attached thereto comprising a plurality of SVSs, each of the SVSs comprising at least one storage virtualization controller (SVC) which comprises a device-side IO device interconnect controller implemented complying with a serial attached SCSI (SAS) protocol; and,
a first data access path and a second data access path are configured passing through the SVSs to form the SVS architecture;
wherein the two data access paths are configured in a way that the SVSs in the first path are connected in a first sequence and the SVSs in the second path are connected in a second sequence different from the first sequence, so that a data path redundancy of the first data access path and the second data access path is achieved, and when one of the SVSs is off-lined such that an SVS which is among the SVSs and which is behind the off-lined SVS, can not be accessed by the first data access path, the SVS which is among the SVSs and which is behind the off-lined SVS can still be accessed by the second data access path.

16. The computer system defined in claim 15, wherein types of the SVSs redundant array of independent disks (RAID) SVSs, RAID head SVSs or just a bunch of drives (JBOD) SVSs, or the combinations constructed by any two or three thereof.

17. The computer system defined in claim 16, wherein the SVS further comprises a physical storage device (PSD) array attached to the at least one storage virtualization controller (SVC) when the SVS is the RAID SVS.

18. The computer system defined in claim 16, wherein the SVS further comprises a PSD array attached to the at least one storage virtualization controller (SVC) when the SVS is the JBOD SVS.

19. The computer system defined in claim 15, wherein the at least one storage virtualization controller (SVC) comprises only one SVC.

20. The computer system defined in claim 19, wherein there are only two data access paths configured in the SVSs: the first and the second data access paths.

21. The computer system defined in claim 15, wherein each of the SVSs comprises two SVCs including a first SVC and a second SVC, and both the SVCs are redundantly configured in the SVS, and the first data access path goes by the first SVCs of the SVSs and the second data access path goes by the second SVCs of the SVSs and wherein the SVS architecture further comprises a third data access path going by the first SVCs and a fourth data access path going by the second SVCs of the SVSs.

22. The computer system defined in claim 15, wherein the first data access path connects the plurality of SVSs starting from a first SVS, then a second SVS, and going forwards in order till a last SVS, while the second data access path connects the plurality of SVSs starting from the first SVS, then jumping to the last SVS, and going backwards in order till the second SVS.

23. The computer system defined in claim 22, wherein the first SVS is a RAID SVS or a RAID head, and the other SVSs are JBOD SVSs.

24. The computer system defined in claim 15, wherein each of the SVSs comprises two SVCs being a first SVC and a second SVC, and both the SVCs are redundantly configured in the SVS.

25. The computer system defined in claim 24, wherein the first data access path goes by the first SVCs of the SVSs and the second data access path goes by the second SVCs of the SVSs.

26. The computer system defined in claim 25, wherein the first data access path connects the plurality of SVSs starting from a first SVS, then a second SVS, and going forwards in order till a last SVS, while the second data access path connects the plurality of SVSs starting from the first SVS, then jumping to the last SVS, and going backwards in order till the second SVS.

27. The computer system defined in claim 15, wherein the first and the second data access paths are configured in a rule that a first and a second SVS of the plurality of SVSs are respectively a starting SVS of the first and the second data access paths in the SVS architecture.

28. The computer system defined in claim 15, wherein the device-side IO device interconnect controller contains at least one SAS port.

29. A method for configuring a storage virtualization subsystem (SVS) architecture comprising a plurality of SVSs, each of the SVSs comprising at least one storage virtualization controller (SVC) which comprises a device-side IO device interconnect controller implemented complying with a serial attached SCSI (SAS) protocol, the method comprising:
configuring a first data access path passing through the SVSs to form the SVS architecture by connecting the SVSs in a first sequence; and,
configuring a second data access path passing through the SVSs to form the SVS architecture by connecting the SVSs in a second sequence different from the first sequence, so that a data path redundancy of the first data access path and the second data access path is achieved, and when one of the SVSs is off-lined such that an SVS which is among the SVSs and which is behind the off-lined SVS, can not be accessed by the first data access path, the SVS which is among the SVSs and which is behind the off-lined SVS can still be accessed by the second data access path.

30. The method defined in claim 29, wherein the types of the plurality of SVSs are redundant array of independent disks (RAID) SVSs, RAID head SVSs or just a bunch of drives (JBOD) SVSs, or the combinations constructed by any two or three thereof.

31. The method defined in claim 30, wherein the SVS further comprises a physical storage device (PSD) array attached to the at least one storage virtualization controller (SVC) when the SVS is the RAID SVS.

32. The method defined in claim 30, wherein the SVS further comprises a PSD array attached to the at least one storage virtualization controller (SVC) when the SVS is the JBOD SVS.

33. The method defined in claim 29, wherein the at least one storage virtualization controller (SVC) comprises only one SVC.

34. The method defined in claim 33, wherein there are only two data access paths configured in the SVSs: the first and the second data access paths.

35. The method defined in claim 29, wherein each of the SVSs comprises two SVCs including a first SVC and a second SVC, and both the SVCs are redundantly configured in the SVS, and the first data access path goes by the first SVCs of the SVSs and the second data access path goes by the second SVCs of the SVSs and wherein the SVS architecture further comprises a third data access path going by the first SVCs and a fourth data access path going by the second SVCs of the SVSs.

36. The method defined in claim 29, wherein the first data access path connects the plurality of SVSs starting from a first SVS, then a second SVS, and going forwards in order till a last SVS, while the second data access path connects the plurality of SVSs starting from the first SVS, then jumping to the last SVS, and going backwards in order till the second SVS.

37. The method defined in claim 36, wherein the first SVS is a RAID SVS or a RAID head, and the other SVSs are JBOD SVSs.

38. The method defined in claim 29, wherein each of the SVSs comprises two SVCs, being a first SVC and a second SVC, and both the SVCs are redundantly configured in the SVS.

39. The method defined in claim 38, wherein the first data access path goes by the first SVCs of the SVSs and the second data access path goes by the second SVCs of the SVSs.

40. The method defined in claim 39, wherein the first data access path connects the plurality of SVSs starting from a first SVS, then a second SVS, and going forwards in order till a last SVS, while the second data access path connects the plurality of SVSs starting from the first SVS, then jumping to the last SVS, and going backwards in order till the second SVS.

41. The method defined in claim 29, wherein the first and the second data access paths are configured in a rule that a first and a second SVS of the plurality of SVSs are respectively a starting SVS of the first and the second data access paths in the SVS architecture.

42. The method defined in claim 29, wherein the device-side 10 device interconnect controller contains at least one SAS port.

43. A method for configuring a storage virtualization subsystem (SVS) architecture comprising a plurality of SVSs, each of the SVSs comprising two redundantly-configured storage virtualization controllers (SVCs), being a first SVC and a second SVC, each of which comprises a device-side IO device interconnect controller implemented complying with a serial attached SCSI (SAS) protocol, the method comprising:

configuring a first data access path passing through the SVSs to form the SVS architecture by connecting the first SVC of the SVSs in a first sequence; and, configuring a second data access path passing through the SVSs to form the SVS architecture by connecting the second SVC of the SVSs in a second sequence, in which a data path redundancy of the first access path and the second data access path is achieved, and when one of the SVSs is off-lined such that an SVS which is among the SVSs and which is behind the off-lined SVS, can not be accessed by the first data access path, the SVS which is among the SVSs and which is behind the off-lined SVS can still be accessed by the second data access path.

44. The method defined in claim 43, wherein the types of the plurality of SVSs are redundant array of independent disks (RAID) SVSs, RAID head SVSs or just a bunch of drives (JBOD) SVSs, or the combinations constructed by any two or three thereof.

45. The method defined in claim 44, wherein the SVS further comprises a physical storage device (PSD) array attached to the at least one storage virtualization controller (SVC) when the SVS is the RAID SVS or the JBOD SVS.

46. The method defined in claim 43, wherein the first data access path and the second data access path are different.

47. The method defined in claim 43, wherein, for two first SVCs of two connected SVSs, there is only one interconnect provided between the two first SVCs, and for two second SVCs of two connected SVSs, there is only one interconnect provided between the two second SVCs.

48. The method defined in claim 43, wherein there are only two data access paths configured in the SVSs: the first and the second data access paths.

49. The method defined in claim 43, wherein the SVS architecture further comprises a third data access path going by the first SVCs and a fourth data access path going by the second SVCs of the SVSs.

50. The method defined in claim 43, wherein the first data access path connects the plurality of SVSs starting from a first SVS, then a second SVS, and going forwards in order till a last SVS, while the second data access path connects the plurality of SVSs starting from the first SVS, then jumping to the last SVS, and going backwards in order till the second SVS and wherein the first SVS is a RAID SVS or a RAID head SVS, and the other SVSs are JBOD SVSs.

51. The method defined in claim 43, wherein the SVS further comprises a PSD array attached to the two redundantly-configured SVCs when the SVS is the RAID SVS.

52. The method defined in claim 43, wherein the SVS further comprises a PSD array attached to the two redundantly-configured SVCs when the SVS is the JBOD SVS.

53. The method defined in claim 43, wherein the plurality of data access paths are configured in a rule that a first and a second SVS of the plurality of SVSs are respectively a starting SVS of the first and the second data access paths of the plurality of data access paths in the SVS architecture.

54. The method defined in claim 43, wherein the device-side IO device interconnect controller contains at least one SAS port.

* * * * *